US009635382B2

(12) United States Patent
Zhou

(10) Patent No.: US 9,635,382 B2
(45) Date of Patent: *Apr. 25, 2017

(54) METHOD, SYSTEM AND COMPUTER PROGRAM PRODUCT FOR DETERMINING A MOTION VECTOR

(75) Inventor: Minhua Zhou, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 425 days.

This patent is subject to a terminal disclaimer.

(21) Appl. No.: 13/344,778

(22) Filed: Jan. 6, 2012

(65) Prior Publication Data

US 2012/0177122 A1 Jul. 12, 2012

Related U.S. Application Data

(60) Provisional application No. 61/430,716, filed on Jan. 7, 2011, provisional application No. 61/482,914, filed on May 5, 2011.

(51) Int. Cl.
*H04N 7/32* (2006.01)
*H04N 19/52* (2014.01)

(52) U.S. Cl.
CPC .................................. *H04N 19/52* (2014.11)

(58) Field of Classification Search
CPC .................................. H04N 7/32; H04N 19/52
(Continued)

(56) References Cited

U.S. PATENT DOCUMENTS 7,272,182 B1 * 9/2007 Nakagawa ....... H04N 19/00587
375/240

8,059,722 B2 * 11/2011 Francois .............. H04N 19/176
375/240.06
(Continued)

FOREIGN PATENT DOCUMENTS

CN 1965321 A 5/2007

OTHER PUBLICATIONS

Minhua Zhou, "Scalable Motion Vector Competition and Simplified MVP Calculation," Joint Collaborative Team on Video Coding (JCT-VC) of ITU-T SG16 WP3 and ISO/IEC JTC1/SC29/WG11 4th Meeting: Daegu, KR, Jan. 20-28, 2011, pp. 1-9.
(Continued)

*Primary Examiner* — Jay Patel
*Assistant Examiner* — Irfan Habib
(74) *Attorney, Agent, or Firm* — Michael A. Davis, Jr.; Charles A. Brill; Frank D. Cimino

(57) ABSTRACT

A prediction unit is identified within a picture of a video sequence. The prediction unit is bordered by neighboring prediction units within the picture. The neighboring prediction units include first and second neighboring prediction units that are separated from one another by at least a third neighboring prediction unit. A subset of the neighboring prediction units is scanned to identify an MVP candidate. The subset includes at least the first and second neighboring prediction units and excludes at least the third neighboring prediction unit. An encoder calculates a difference between a motion vector of the MVP candidate and a motion vector of the prediction unit, and encodes the difference and an index to identify the MVP candidate. A decoder decodes the difference, and calculates the motion vector of the prediction unit by adding the difference to the motion vector of the MVP candidate.

54 Claims, 15 Drawing Sheets

(58) Field of Classification Search
USPC .................................................. 375/240.16
See application file for complete search history.

(56) References Cited

U.S. PATENT DOCUMENTS

| | | | | |
|---|---|---|---|---|
| 8,155,193 B2* | 4/2012 | Kato | .................... | H04N 19/172 375/240.16 |
| 8,213,512 B2* | 7/2012 | Lin | ........................ | H04N 19/51 375/240.01 |
| 8,249,154 B2* | 8/2012 | Chen | .................... | H04N 19/176 375/240.12 |
| 8,259,808 B2* | 9/2012 | Lin | ................ | H04N 21/234363 375/240.16 |
| 8,320,470 B2* | 11/2012 | Huang | ................ | H04N 19/895 375/240.24 |
| 8,320,692 B2* | 11/2012 | Pateux | ................ | H04N 19/105 382/238 |
| 8,416,855 B2* | 4/2013 | Wang | ................ | H04N 19/139 375/240.16 |
| 8,509,551 B2* | 8/2013 | Moriya | ................ | H04N 19/139 375/240.13 |
| 8,634,457 B2* | 1/2014 | Lee | ........................ | H04N 19/61 375/240.01 |
| 8,660,176 B2* | 2/2014 | Lee | ...................... | H04N 19/176 375/240.02 |
| 2005/0053297 A1* | 3/2005 | Mukerjee | ............. | H04N 19/105 382/236 |
| 2005/0238103 A1* | 10/2005 | Subramaniyan | ....... | H04N 19/56 375/240.16 |
| 2005/0281473 A1* | 12/2005 | Kim | .................... | H04N 19/105 382/236 |
| 2008/0069234 A1* | 3/2008 | Kadono | .................... | G06F 1/03 375/240.16 |
| 2008/0159394 A1* | 7/2008 | Lee | ...................... | H04N 19/176 375/240.16 |
| 2009/0003451 A1* | 1/2009 | Lin | ........................ | H04N 19/52 375/240.16 |
| 2009/0168890 A1* | 7/2009 | Holcomb | ............... | H04N 19/52 375/240.16 |
| 2009/0207917 A1 | 8/2009 | Kadono et al. | | |
| 2009/0232207 A1* | 9/2009 | Chen | .................... | H04N 19/176 375/240.12 |
| 2010/0284469 A1* | 11/2010 | Sato | .................... | H04N 19/176 375/240.16 |
| 2010/0296579 A1* | 11/2010 | Panchal | ............... | H04N 19/172 375/240.15 |
| 2011/0176615 A1* | 7/2011 | Lee | ........................ | H04N 19/52 375/240.16 |
| 2011/0261888 A1* | 10/2011 | Cammas | .............. | H04N 19/176 375/240.24 |
| 2012/0106636 A1* | 5/2012 | Kim | .................... | H04N 19/176 375/240.12 |
| 2012/0163466 A1* | 6/2012 | Sugio | .................... | H04N 19/139 375/240.16 |

OTHER PUBLICATIONS

Minhua Zhou et al., "CE9: Simplified AMVP Design (SP06S1, SP06S2)," Joint Collaborative Team on Video Coding (JCT-VC) of ITU-T SG16 WP3 and ISO/IEC JTC1/SC29/WG11 6th Meeting: Torino, IT, Jul. 14-22, 2011, pp. 1-12.

The State Intellectual Property Office of P.R.C. Search Report for Chinese Application No. 201280004783X dated Mar. 2, 2016.

* cited by examiner

| LCU 00 | LCU 01 | LCU 02 |
|---|---|---|
| LCU 10 | LCU 11 | LCU 12 |
| LCU 20 | LCU 21 | LCU 22 |

METHOD, SYSTEM AND COMPUTER PROGRAM PRODUCT FOR DETERMINING A MOTION VECTOR

CROSS-REFERENCE TO RELATED APPLICATIONS

This application is related to co-owned co-pending U.S. patent application Ser. No. 13/344,808, filed on even date herewith, entitled METHOD, SYSTEM AND COMPUTER PROGRAM PRODUCT FOR COMPUTING A MOTION VECTOR, naming Minhua Zhou as inventor.

All of the above-identified applications are hereby fully incorporated herein by reference for all purposes.

BACKGROUND

The disclosures herein relate in general to video coding, and in particular to a method, system and computer program product for determining a motion vector.

A high efficiency video coding ("HEVC") standard has been discussed by a joint collaborative team on video coding ("JCT-VC") of the International Organization for Standardization ("ISO"), International Electrotechnical Commission ("IEC"), Moving Picture Experts Group ("MPEG"), and International Telecommunication Union's Telecommunication Standardization Sector ("ITU-T"). For the HEVC standard, one goal is efficiency improvement over the MPEG-4 advanced video coding ("AVC") H.264 High Profile standard. In one example, a prediction unit ("current PU") has its own respective motion vector, which is encoded by predictive coding, so that: (a) from a motion vector predictor ("MVP") list, which includes respective motion vectors of all prediction units that border the current PU's top and/or left side (collectively "neighboring PUs"), a motion vector is selected ("selected motion vector") as having a least difference from the current PU's motion vector; and (b) such difference and an MVP index (to identify the neighboring PU that has the selected motion vector) are encoded. Notwithstanding such example, more efficiency improvement is possible.

SUMMARY

A prediction unit is identified within a picture of a video sequence. The prediction unit is bordered by neighboring prediction units within the picture. The neighboring prediction units include first and second neighboring prediction units that are separated from one another by at least a third neighboring prediction unit. A subset of the neighboring prediction units is scanned to identify an MVP candidate. The subset includes at least the first and second neighboring prediction units and excludes at least the third neighboring prediction unit. An encoder calculates a difference between a motion vector of the MVP candidate and a motion vector of the prediction unit, and encodes the difference and an index to identify the MVP candidate. A decoder decodes the difference, and calculates the motion vector of the prediction unit by adding the difference to the motion vector of the MVP candidate.

DETAILED DESCRIPTION

Figures 1, 2:
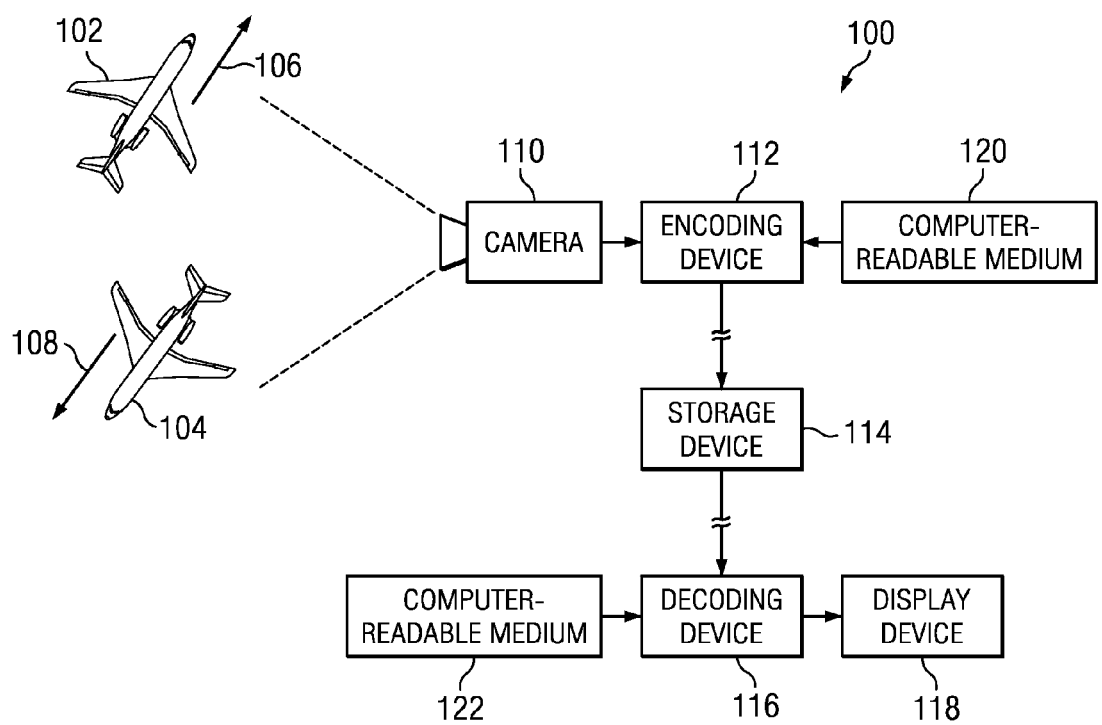
FIG. 1 is a block diagram of an information handling system for encoding and decoding pictures.
FIG. 2 is a conceptual illustration of largest coding units ("LCUs") within a digitized picture that is processed by the system of FIG. 1.

FIG. 1 is a block diagram of an information handling system, indicated generally at 100, for encoding and decoding pictures. In the example of FIG. 1, physical objects 102 and 104 are capable of moving in various directions (e.g., as indicated by arrows 106 and 108, respectively). During a period of time, a video camera 110: (a) views such objects and their surrounding foregrounds and backgrounds; (b) digitizes pictures of such views; and (c) outputs a video sequence of such digitized (or "digital") pictures to an encoding device 112. The encoding device 112: (a) receives the video sequence of such digitized pictures from the video camera 110; (b) in response thereto, encodes the video sequence of such digitized pictures into a binary logic bit stream; and (c) outputs such bit stream to a storage device 114, which receives and stores such bit stream. In one embodiment, the encoding device 112 is operable to perform such encoding in accordance with an HEVC standard (e.g., H.265 standard).

A decoding device 116: (a) reads such bit stream from the storage device 114; (b) in response thereto, decodes such bit stream into the video sequence of such digitized pictures; and (c) outputs the video sequence of such digitized pictures to a display device 118. The display device 118: (a) receives the video sequence of such digitized pictures from the decoding device 116; and (b) in response thereto, displays the video sequence of visual images (e.g., visual images of the objects 102 and 104 and their surrounding foregrounds and backgrounds), which are viewable by a human user. In one embodiment, the decoding device 116 is operable to perform such decoding in accordance with the HEVC standard.

In an alternative embodiment: (a) the encoding device 112 outputs such bit stream directly to the decoding device 116 via a communication channel (e.g., Ethernet, Internet, or wireless communication channel); and (b) accordingly, the decoding device 116 receives such bit stream directly from the encoding device 112. In such alternative embodiment, the storage device 114 either: (a) concurrently receives and stores such bit stream from the encoding device 112; or (b) is absent from the system 100.

The encoding device 112 performs its operations in response to instructions of a computer-readable program that is stored on a computer-readable medium 120 (e.g., hard disk drive, flash memory card, or other nonvolatile storage device). Similarly, the decoding device 116 performs its operations in response to instructions of a computer-readable program that is stored on a computer-readable medium 122. The system 100 is formed by electronic circuitry components for performing the system 100 operations.

FIG. 2 is a conceptual illustration of largest coding units ("LCUs") within a digitized picture that is processed by the system 100. In the illustrative embodiment, each LCU is a square array having a particular size (e.g., 64×64 pixels, which equals 4,096 pixels per LCU). In FIG. 2, the LCUs are numbered LCU ab, where: (a) a is an LCU row number that ranges from 0 through N; (b) N is a total number of LCU rows within the digitized picture; (c) b is an LCU column number that ranges from 0 through M; and (d) M is a total number of LCU columns within the digitized picture. For clarity, although N>2 and M>2, FIG. 2 shows only nine of the LCUs, where a ranges from 0 through 2, and where b ranges from 0 through 2.

Figure 3:
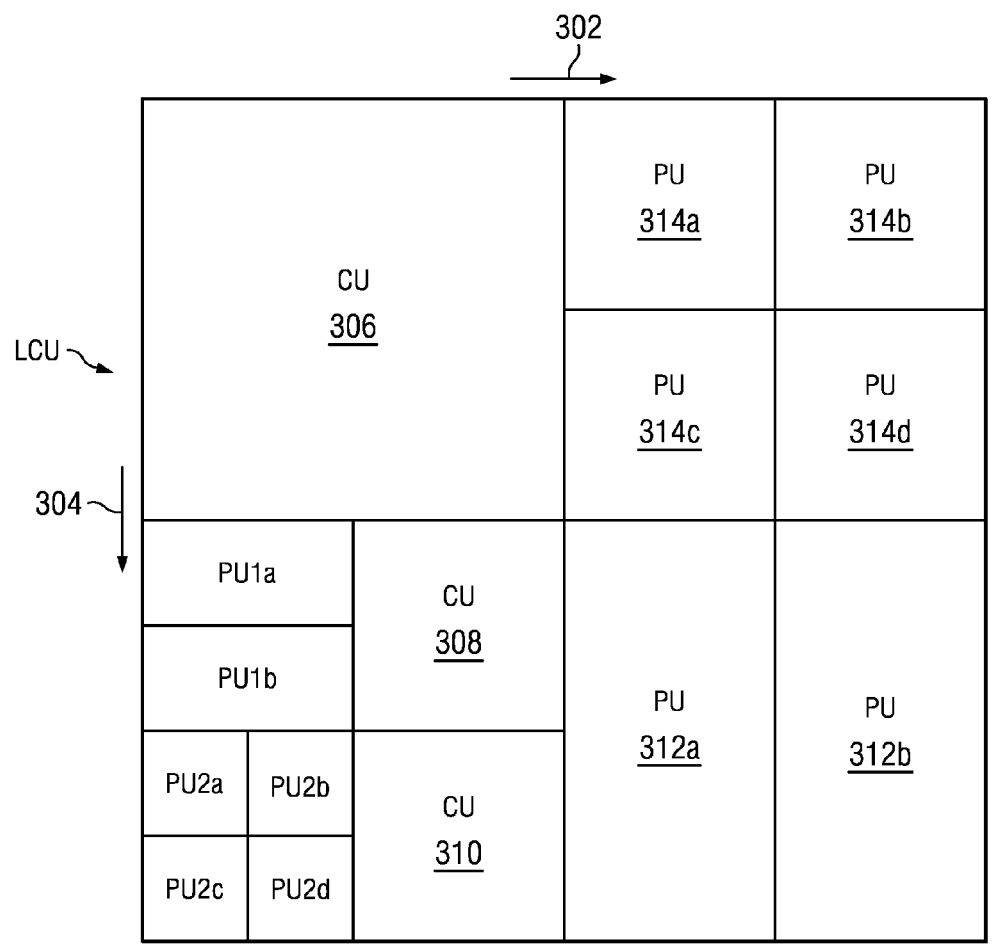
FIG. 3 is a conceptual illustration of coding units ("CUs") and prediction units ("PUs") within an example LCU of FIG. 2.

FIG. 3 is a conceptual illustration of coding units ("CUs") and prediction units ("PUs") within an example LCU of FIG. 2. The encoding device 112 encodes a digitized picture into a binary logic bit stream by encoding pixels of such digitized picture in a raster scan order (e.g., left-to-right and top-to-bottom as indicated by raster scanning arrows 302 and 304, respectively). Similarly, the decoding device 116 decodes such bit stream into such digitized picture by decoding pixels of such digitized picture in the same raster scan order.

In FIG. 3: (a) a CU 306 includes a single PU, so that the CU 306 is coextensive with its single PU; (b) a CU 308 includes a single PU, so that the CU 308 is coextensive with its single PU; and (c) a CU 310 includes a single PU, so that the CU 310 is coextensive with its single PU. Also, in FIG. 3: (a) another CU includes two PUs 312a and 312b; and (b) yet another CU includes two PUs that are labeled PU1a and PU1b. Moreover, in FIG. 3: (a) another CU includes four PUs 314a, 314b, 314c and 314d; and (b) yet another CU includes four PUs that are labeled PU2a, PU2b, PU2c and PU2d.

Accordingly, as shown in FIG. 3, the example LCU includes CUs and PUs that have a variety of sizes and shapes. Those sizes and shapes, the number of CUs, and the number of PUs are potentially different on an LCU-by-LCU basis. In that manner, each LCU includes its own respective combination of CUs and PUs that have a variety of sizes and shapes. In the illustrative embodiment, the minimum PU size is 4×8 (and/or 8×4) pixels, the maximum PU size is 64×64 pixels, and the maximum CU size is 64×64 pixels. In one embodiment, the minimum CU size is 8×8 pixels. In another embodiment, the minimum CU size is 16×16 pixels.

Figure 4:
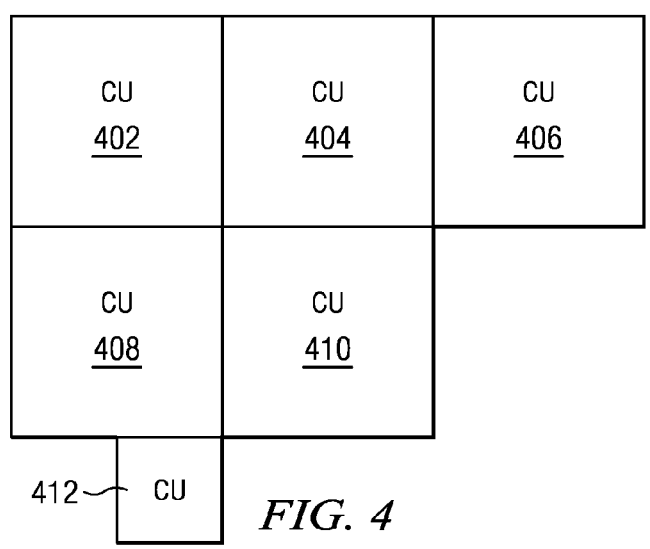
FIG. 4 is a conceptual illustration of CUs within a picture k that is processed by the system of FIG. 1.

FIG. 4 is a conceptual illustration of CUs 402, 404, 406, 408, 410 and 412 within a picture k that is processed by the system 100. Such CUs exist within one or more LCUs. In one example: (a) a first LCU includes the CUs 402, 408 and 412; and (b) a second LCU includes the CUs 404, 406 and 410. The CU 412 is smaller than the CUs 402, 404, 406, 408 and 410, similar to the manner in which the CU 308 is smaller than the CU 306 in FIG. 3. Moreover, the picture k includes additional CUs, which are not shown in FIG. 4 for clarity.

Figure 5:
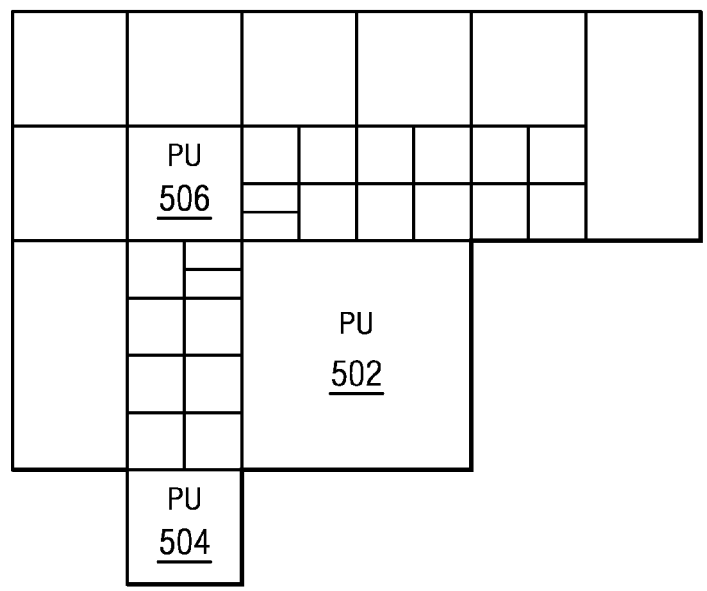
FIG. 5 is a conceptual illustration of PUs within the CUs of FIG. 4.

FIG. 5 is a conceptual illustration of PUs within the CUs of FIG. 4. In FIG. 5, each square is a PU, and each rectangle is a PU. A square is a rectangle whose sides have equal length. For clarity, due to the large number (i.e., 33) of PUs in FIG. 5, only PUs 502, 504 and 506 are labeled. Moreover, the picture k includes additional PUs (within the additional CUs of the picture k), which are not shown in FIG. 5 for clarity.

Figure 6:
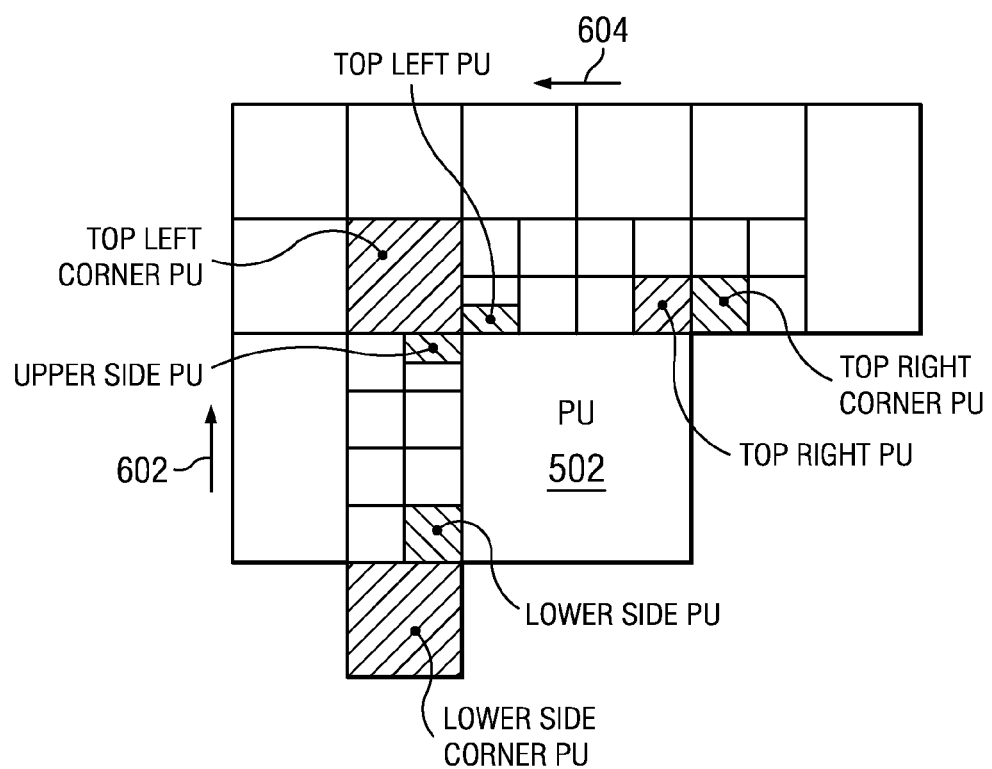
FIG. 6 is a conceptual illustration of the PUs of FIG. 5, in a first embodiment.

FIG. 6 is a conceptual illustration of the PUs of FIG. 5, in a first embodiment. As shown in FIG. 6, a shaded subset of PUs includes only the following seven PUs (collectively "neighboring corner PUs") and excludes the other PUs of FIG. 5: (a) a lower side corner PU, which borders a first corner of the PU 502; (b) a lower side PU, which borders the first corner of the PU 502; (c) an upper side PU, which borders a second corner of the PU 502; (d) a top left corner PU, which borders the second corner of the PU 502; (e) a top left PU, which borders the second corner of the PU 502; (f) a top right PU, which borders a third corner of the PU 502; and (g) a top right corner PU, which borders the third corner of the PU 502. In the example of FIG. 6: (a) the lower side PU and the upper side PU are separated from one another by additional left side PUs, which are interposed between the lower side PU and the upper side PU, so that the lower side PU and the upper side PU do not border one another; and (b) the top left PU and the top right PU are separated from one another by additional top side PUs, which are interposed between the top left PU and the top right PU, so that the top left PU and the top right PU do not border one another.

Figure 7:
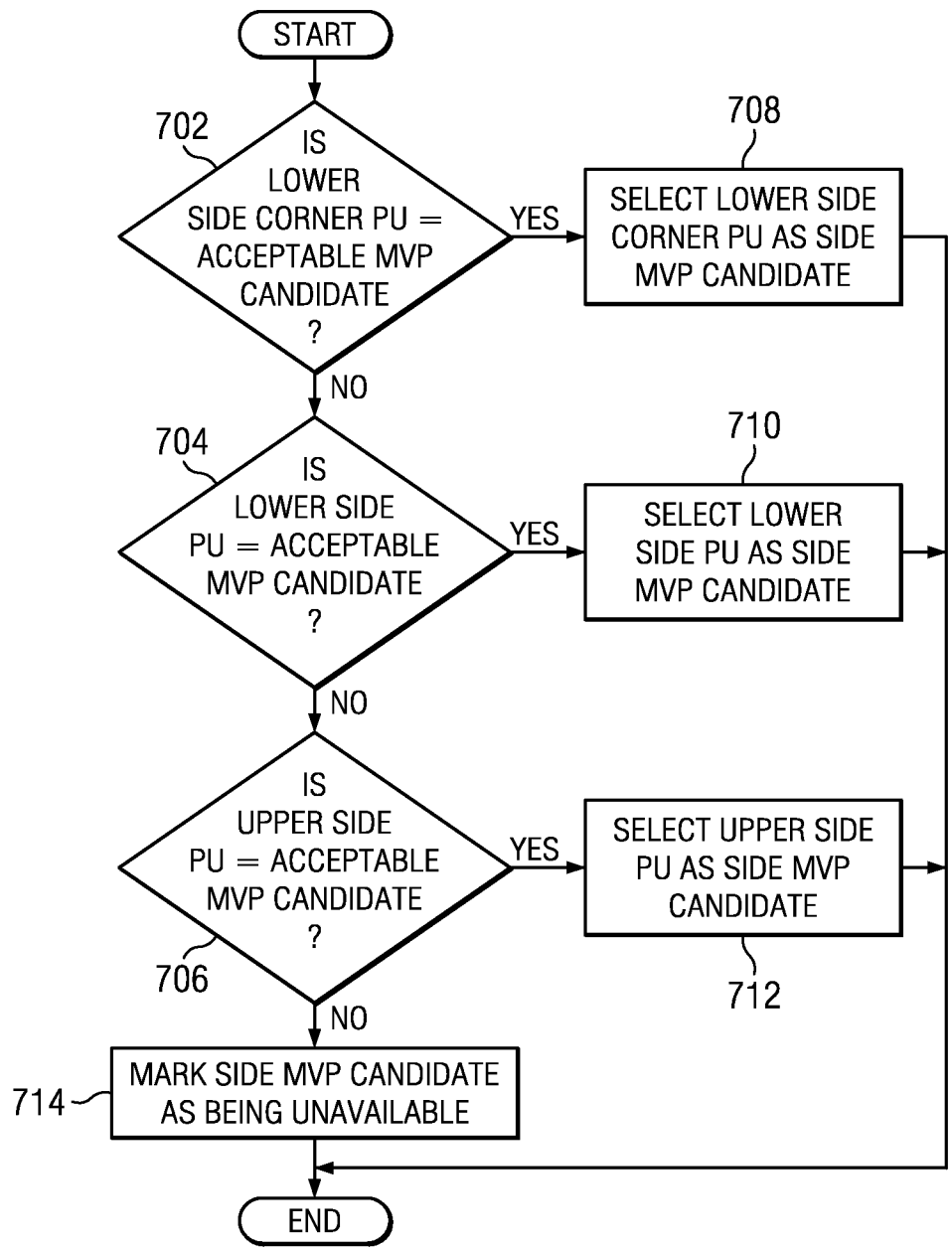
FIG. 7 is a flowchart of a first operation of an encoding device of the system of FIG. 1, in the first embodiment.
Figure 8:
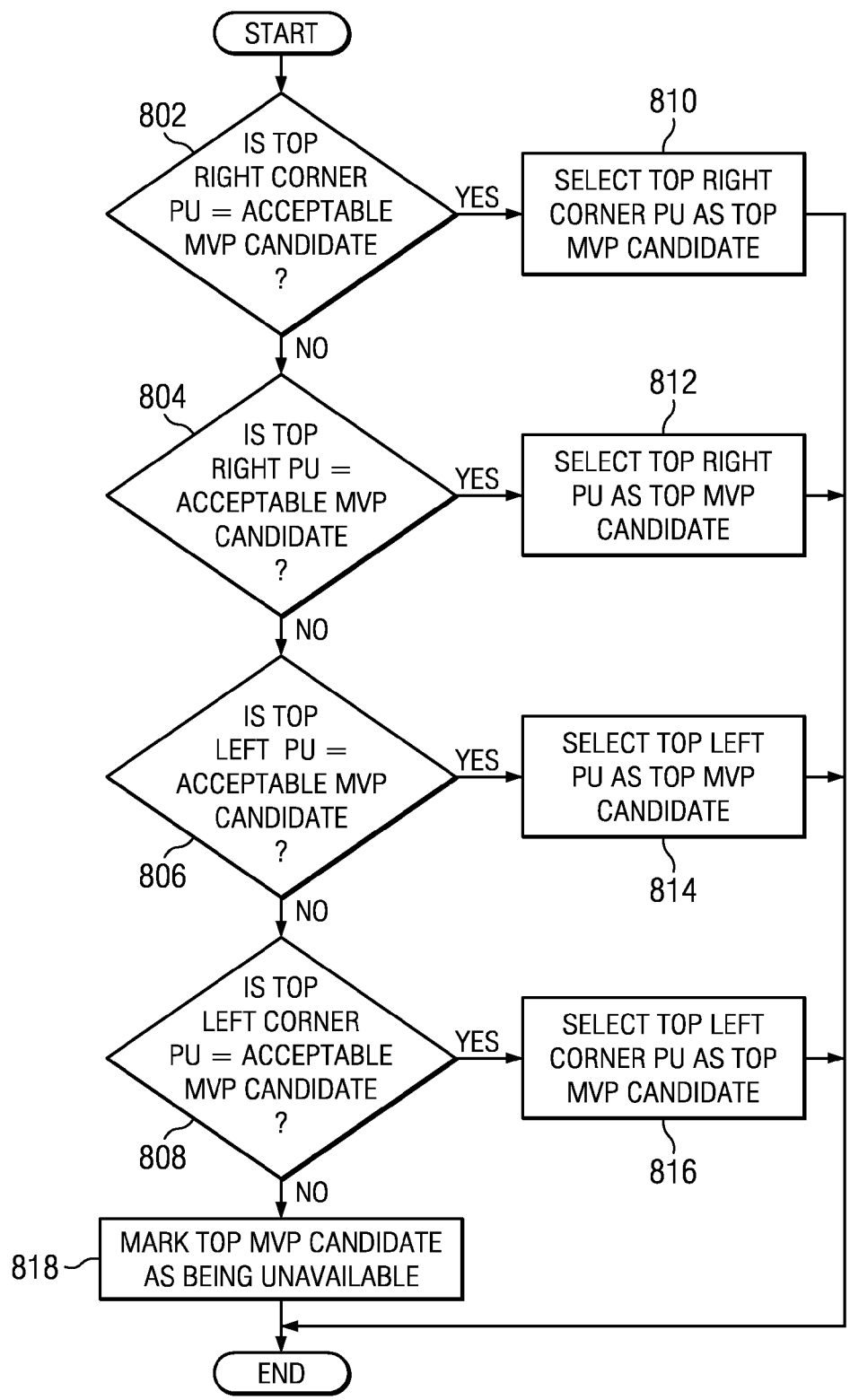
FIG. 8 is a flowchart of a second operation of the encoding device of the system of FIG. 1, in the first embodiment.
Figure 9:
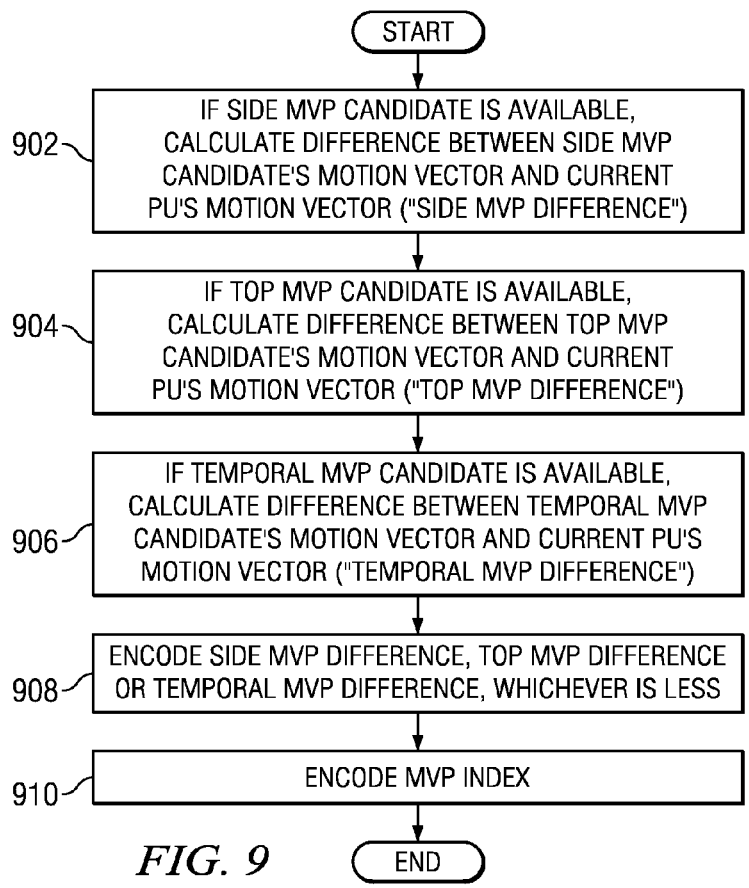
FIG. 9 is a flowchart of a third operation of the encoding device of the system of FIG. 1, in the first embodiment, and in second and third embodiments.

FIG. 7 is a flowchart of a first operation of the encoding device 112, in the first embodiment. FIG. 8 is a flowchart of a second operation of the encoding device 112, in the first embodiment. FIG. 9 is a flowchart of a third operation of the encoding device 112, in the first, second and third embodiments.

In the illustrative embodiment, a current PU (e.g., PU 502 in the example of FIG. 6) has its own respective motion vector, which the encoding device 112 encodes by predictive coding, such as: (a) in accordance with FIGS. 7-9 for the first embodiment; (b) in accordance with FIGS. 9, 11 and 12 for the second embodiment; and (c) in accordance with FIGS. 9, 19 and 20 for the third embodiment. In one example, where the object 102 image is at least partially within the current PU of the picture k and a matching PU of a preceding reference picture, the current PU's motion vector numerically indicates a direction and magnitude of the object 102 motion between such matching PU and the current PU. In the illustrative embodiment, the encoding device 112 so encodes respective motion vectors of various PUs (within the picture k), each of which is so encoded in succession as the current PU, in the raster scan order (e.g., left-to-right and top-to-bottom as indicated by raster scanning arrows 302 and 304, respectively, of FIG. 3).

Referring to FIG. 7, at steps 702, 704 and 706, the encoding device 112 identifies and scans (in an order shown by arrow 602 of FIG. 6) the lower side corner PU, the lower side PU, and the upper side PU to determine whether one of those PUs is acceptable as an MVP candidate. In one example, if a single PU is positioned as both the lower side PU and the upper side PU (e.g., if such single PU borders the entire left side of the PU 502), then the encoding device 112 scans (in the order shown by arrow 602 of FIG. 6) the lower side corner PU and such single PU to determine whether one of those PUs is acceptable as an MVP candidate. At steps 708, 710 and 712, in response to the encoding device 112 determining that one of those PUs is acceptable as an MVP candidate ("acceptable side PU"), the encoding device 112 ends such scanning and selects (e.g., identifies) the acceptable side PU as the side MVP candidate, so that the acceptable side PU's motion vector is used as the side MVP candidate's motion vector. At a step 714, in response to the encoding device 112 determining that neither the lower side corner PU, the lower side PU, nor the upper side PU is acceptable as an MVP candidate, the encoding device 112 marks the side MVP candidate as being unavailable. In the first and second embodiments, if a PU is acceptable as an MVP candidate, then such PU satisfies the following conditions: (a) such PU is inter-coded; (b) such PU has a motion vector for the same or different direction (e.g., LIST0 or LIST1) as the current PU's motion vector; and (c) such PU uses the same or different reference index as the current PU.

Referring to FIG. 8, at steps 802, 804, 806 and 808, the encoding device 112 identifies and scans (in an order shown by arrow 604 of FIG. 6) the top right corner PU, the top right PU, the top left PU, and the top left corner PU to determine whether one of those PUs is acceptable as an MVP candidate. In one example, if a single PU is positioned as both the top right PU and the top left PU (e.g., if such single PU borders the entire top side of the PU 502), then the encoding device 112 scans (in the order shown by arrow 604 of FIG. 6) the top right corner PU, such single PU, and the top left corner PU to determine whether one of those PUs is acceptable as an MVP candidate. At steps 810, 812, 814 and 816, in response to the encoding device 112 determining that one of those PUs is acceptable as an MVP candidate ("acceptable top PU"), the encoding device 112 ends such scanning and selects the acceptable top PU as the top MVP candidate, so that the acceptable top PU's motion vector is used as the top MVP candidate's motion vector. At a step 818, in response to the encoding device 112 determining that neither the top right corner PU, the top right PU, the top left PU, nor the top left corner PU is acceptable as an MVP candidate, the encoding device 112 marks the top MVP candidate as being unavailable.

In that manner, the encoding device 112 reduces its worst case processing load in the first embodiment, without reducing the coding efficiency, because the encoding device 112 scans (e.g., searches): (a) only up to three neighboring corner PUs to select the side MVP candidate; and (b) only up to four neighboring corner PUs to select the top MVP candidate. By comparison, in a previous technique: (a) all PUs that border the current PU's top and/or left side (collectively "neighboring PUs") would have been scanned; and (b) accordingly, if the minimum PU size is 4×8 (and/or 8×4) pixels, then up to 17 neighboring PUs would have been scanned to select the side MVP candidate, and up to 18 neighboring PUs would have been scanned to select the top MVP candidate.

In addition to the side MVP candidate and/or the top MVP candidate, the encoding device 112 selects a temporal MVP candidate (if available and acceptable) from an applicable reference frame. Such selection of the temporal MVP candidate is performed in a conventional manner.

After the encoding device 112 performs the operations of FIGS. 7 and 8, it performs the operations of FIG. 9 and the remainder of its encoding operations. Referring to FIG. 9, the encoding device 112 selects either the side MVP candidate's motion vector, the top MVP candidate's motion vector or the temporal MVP candidate's motion vector ("selected motion vector") as having a least difference from the current PU's motion vector. For example, if the side MVP candidate's motion vector has the least difference from the current PU's motion vector, then the encoding device 112 identifies the side MVP candidate as the selected MVP. Likewise, if the top MVP candidate's motion vector has the least difference from the current PU's motion vector, then the encoding device 112 identifies the top MVP candidate as the selected MVP. Similarly, if the temporal MVP candidate's motion vector has the least difference from the current PU's motion vector, then the encoding device 112 identifies the temporal MVP candidate as the selected MVP.

Accordingly, at a step 902, if the side MVP candidate is available, then the encoding device 112 calculates a difference between the side MVP candidate's motion vector and the current PU's motion vector ("side MVP difference"). Similarly, at a next step 904, if the top MVP candidate is available, then the encoding device 112 calculates a difference between the top MVP candidate's motion vector and the current PU's motion vector ("top MVP difference"). Further, at a next step 906, if the temporal MVP candidate is available, then the encoding device 112 calculates a difference between the temporal MVP candidate's motion vector and the current PU's motion vector ("temporal MVP difference").

At a next step 908 the encoding device 112 encodes the side MVP difference, the top MVP difference or the temporal MVP difference, whichever is less. At a next step 910, the encoding device 112 encodes an MVP index to identify the selected MVP. For example, if only one of the side MVP candidate, the top MVP candidate or the temporal MVP candidate is available, then the encoding device 112 encodes: (a) a difference between such available MVP candidate's motion vector and the current PU's motion vector; and (b) an MVP index to identify such available MVP candidate as the selected MVP.

The encoding device 112 and the decoding device 116 operate in response to any of eight cases, as shown in the following MVP Index Table.

MVP Index Table

| Case | Side MVP Candidate | Top MVP Candidate | Temporal MVP Candidate |
|---|---|---|---|
| 0 | Unavailable | Unavailable | Unavailable |
| 1 | Unavailable | Unavailable | Available (MVP index = 0) |
| 2 | Unavailable | Available (MVP index = 0) | Unavailable |
| 3 | Unavailable | Available (MVP index = 0) | Available (MVP index = 1) |
| 4 | Available (MVP index = 0) | Unavailable | Unavailable |
| 5 | Available (MVP index = 0) | Unavailable | Available (MVP index = 1) |
| 6 | Available (MVP index = 0) | Available (MVP index = 1) | Unavailable |
| 7 | Available (MVP index = 0) | Available (MVP index = 1) | Available (MVP index = 2) |

In the event of Case 0: (a) at the step 908, the encoding device 112 encodes an actual value of the current PU's motion vector (instead of encoding the side MVP difference, the top MVP difference or the temporal MVP difference); and (b) at the step 910, the encoding device 112 encodes an MVP index=0. In the event of Cases 1-7, the encoding device 112 encodes an MVP index, as applicable, according to the MVP Index Table above.

In the first embodiment, the decoding device 116: (a) performs the operations of FIGS. 7 and 8 to identify the side MVP candidate (if available) and the top MVP candidate (if available); (b) identifies the temporal MVP candidate (if available); and (c) in response to such identification, determines whether the decoded MVP index is referencing the side MVP candidate, the top MVP candidate or the temporal MVP candidate, according to the MVP Index Table above.

Figure 10:
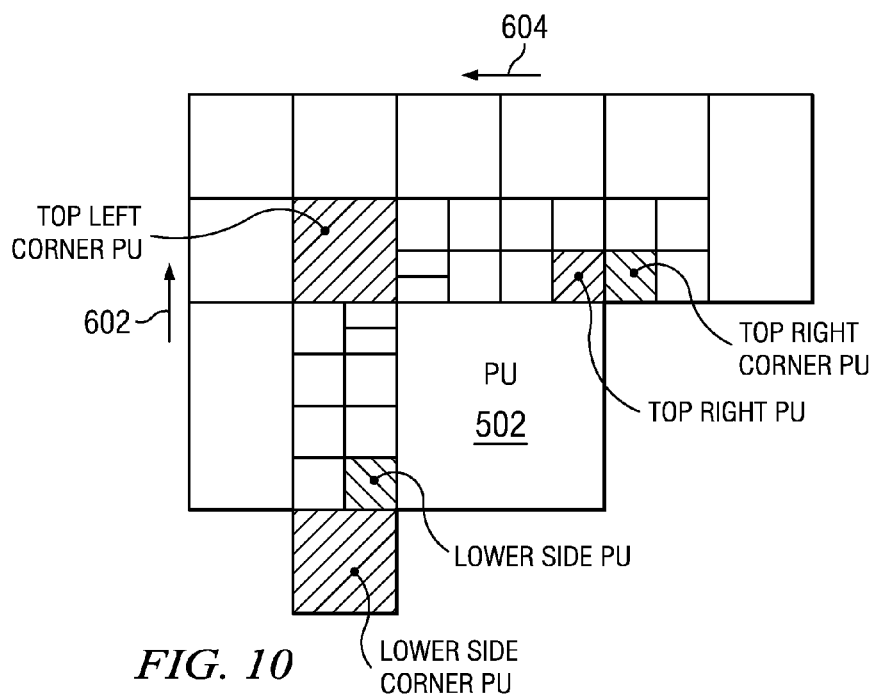
FIG. 10 is a conceptual illustration of the PUs of FIG. 5, in a second embodiment.

FIG. 10 is a conceptual illustration of the PUs of FIG. 5, in a second embodiment. As shown in FIG. 10, a shaded subset of PUs includes only the following five PUs (collectively "neighboring corner PUs") and excludes the other PUs of FIG. 5: (a) the lower side corner PU, which borders the first corner of the PU 502; (b) the lower side PU, which borders the first corner of the PU 502; (c) the top left corner PU, which borders the second corner of the PU 502; (d) the top right PU, which borders the third corner of the PU 502; and (e) the top right corner PU, which borders the third corner of the PU 502. In the example of FIG. 10: (a) the lower side PU and the top left corner PU are separated from one another by additional left side PUs, which are interposed between the lower side PU and the top left corner PU, so that the lower side PU and the top left corner PU do not border one another; and (b) the top left corner PU and the top right PU are separated from one another by additional top side PUs, which are interposed between the top left corner PU and the top right PU, so that the top left corner PU and the top right PU do not border one another.

Figure 11:
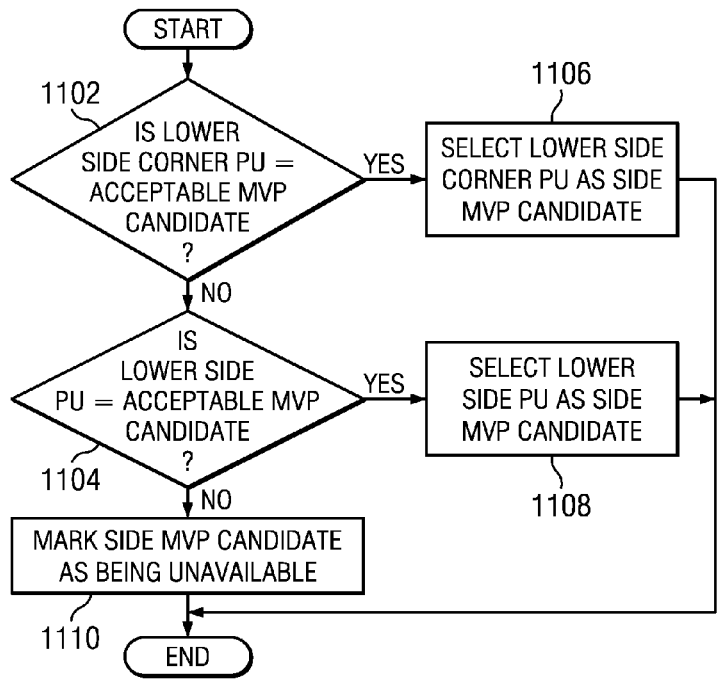
FIG. 11 is a flowchart of a first operation of the encoding device of the system of FIG. 1, in the second embodiment.
Figure 12:
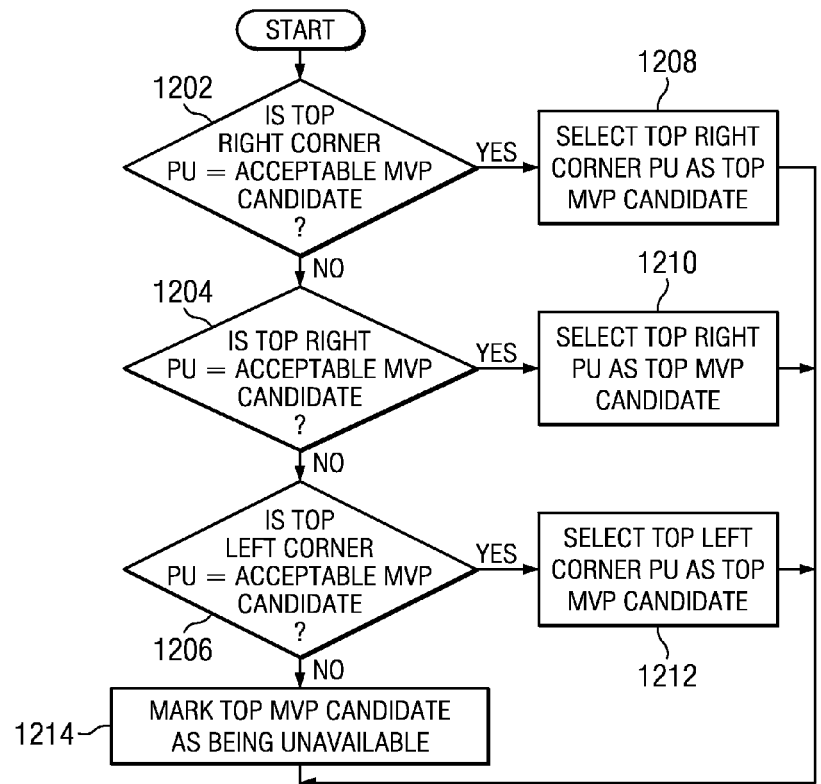
FIG. 12 is a flowchart of a second operation of the encoding device of the system of FIG. 1, in the second embodiment.

FIG. 11 is a flowchart of a first operation of the encoding device 112, in the second embodiment. FIG. 12 is a flowchart of a second operation of the encoding device 112, in the second embodiment.

Referring to FIG. 11, at steps 1102 and 1104, the encoding device 112 identifies and scans (in an order shown by arrow 602 of FIG. 10) the lower side corner PU and the lower side PU to determine whether one of those PUs is acceptable as an MVP candidate. At steps 1106 and 1108, in response to the encoding device 112 determining that one of those PUs is acceptable as an MVP candidate ("acceptable side PU"), the encoding device 112 ends such scanning and selects the acceptable side PU as the side MVP candidate, so that the acceptable side PU's motion vector is used as the side MVP candidate's motion vector. At a step 1110, in response to the encoding device 112 determining that neither the lower side corner PU nor the lower side PU is acceptable as an MVP candidate, the encoding device 112 marks the side MVP candidate as being unavailable.

Referring to FIG. 12, at steps 1202, 1204 and 1206, the encoding device 112 identifies and scans (in an order shown by arrow 604 of FIG. 10) the top right corner PU, the top right PU, and the top left corner PU to determine whether one of those PUs is acceptable as an MVP candidate. At steps 1208, 1210 and 1212, in response to the encoding device 112 determining that one of those PUs is acceptable as an MVP candidate ("acceptable top PU"), the encoding device 112 ends such scanning and selects the acceptable top PU as the top MVP candidate, so that the acceptable top PU's motion vector is used as the top MVP candidate's motion vector. At a step 1214, in response to the encoding device 112 determining that neither the top right corner PU, the top right PU, nor the top left corner PU is acceptable as an MVP candidate, the encoding device 112 marks the top MVP candidate as being unavailable.

In that manner, the encoding device 112 further reduces its worst case processing load in the second embodiment, without reducing the coding efficiency, because the encoding device 112 scans: (a) only up to two neighboring corner PUs to select the side MVP candidate; and (b) only up to three neighboring corner PUs to select the top MVP candidate.

After the encoding device 112 performs the operations of FIGS. 11 and 12, it performs the operations of FIG. 9 and the remainder of its encoding operations.

In the second embodiment, the decoding device 116: (a) performs the operations of FIGS. 11 and 12 to identify the side MVP candidate (if available) and the top MVP candidate (if available); (b) identifies the temporal MVP candidate (if available); and (c) in response to such identification, determines whether the decoded MVP index is referencing the side MVP candidate, the top MVP candidate or the temporal MVP candidate, according to the MVP Index Table above.

Referring again to FIG. 6, in an alternative embodiment, the encoding device 112: (a) identifies and scans (in the following order, or optionally in a different order) the lower side PU and the upper side PU to determine whether one of those PUs is acceptable as an MVP candidate ("first MVP candidate"), and ends such scanning in response to determining that one of those PUs is so acceptable; (b) identifies and scans (in the following order, or optionally in a different order) the top right PU and the top left PU to determine whether one of those PUs is acceptable as an MVP candidate ("second MVP candidate"), and ends such scanning in response to determining that one of those PUs is so acceptable; (c) identifies and scans (in the following order, or optionally in a different order) the lower side corner PU, the top left corner PU, and the top right corner PU to determine whether one of those PUs is acceptable as an MVP candidate ("third MVP candidate"), and ends such scanning in response to determining that one of those PUs is so acceptable; (d) calculates a fourth MVP candidate's motion vector in response to the first, second and third MVP candidates' respective motion vectors (e.g., by calculating an average or median of the first, second and third MVP candidates' respective motion vectors); (e) from among the first, second, third and fourth MVP candidates' respective motion vectors, selects a motion vector ("selected motion vector") that has a least difference from the current PU's motion vector; and (f) encodes (for the current PU) such difference and an MVP index to identify the MVP candidate ("selected MVP") that has the selected motion vector, and performs the remainder of its encoding operations. In this alternative embodiment, if a PU is acceptable as an MVP candidate, then such PU satisfies the same conditions as discussed hereinabove in connection with the first and second embodiments.

Figure 13:
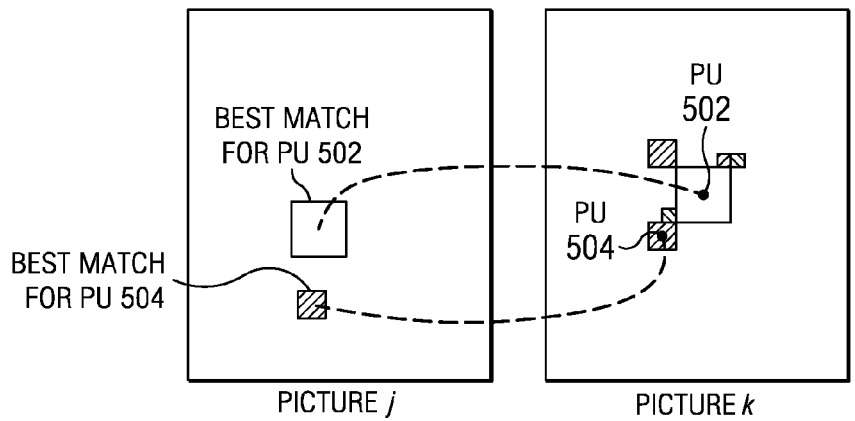
FIG. 13 is a conceptual illustration of a first example, in which two PUs (within a picture j) are best matches for two PUs (within the picture k) of FIG. 5, respectively.

FIG. 13 is a conceptual illustration of a first example, in which two PUs (within a picture j) are best matches for the PUs 502 and 504 (within the picture k), respectively, as shown by dashed lines in FIG. 13. For that reason, in the first example, the picture j is a reference picture (or "reference frame") for the PUs 502 and 504 (within the picture k). Accordingly, in the first example, the PUs 502 and 504 (within the picture k) have the same reference frame (picture j).

Figure 14:
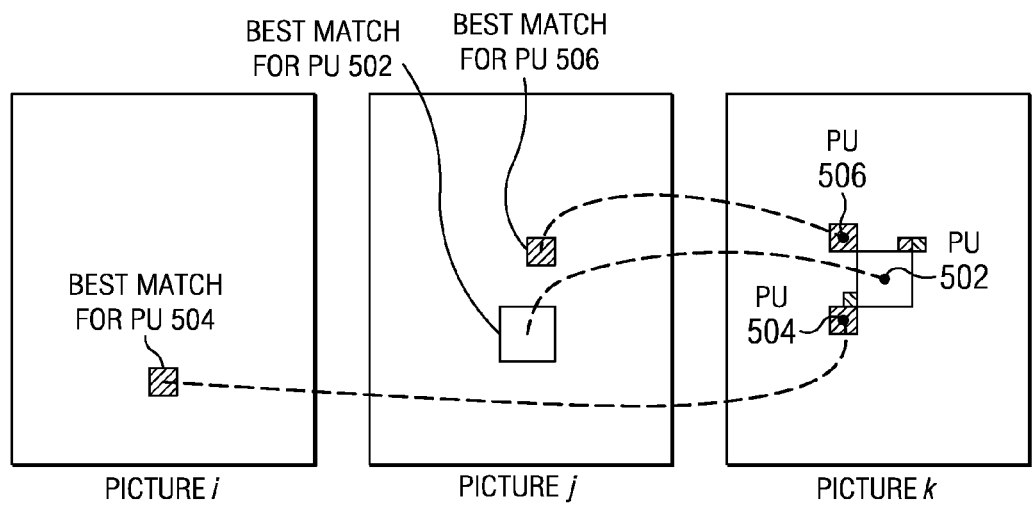
FIG. 14 is a conceptual illustration of a second example, in which: (a) two PUs (within the picture j) are best matches for two PUs (within the picture k) of FIG. 5, respectively; and (b) a PU (within a picture i) is a best match for another PU (within the picture k) of FIG. 5.

FIG. 14 is a conceptual illustration of a second example, in which: (a) two PUs (within the picture j) are best matches for the PUs 502 and 506 (within the picture k), respectively, as shown by dashed lines in FIG. 14; and (b) a PU (within a picture i) is a best match for the PU 504 (within the picture k), as shown by another dashed line in FIG. 14. For that reason, in the second example: (a) the picture j is a reference frame for the PUs 502 and 506 (within the picture k); and (b) the picture i is a reference frame for the PU 504 (within the picture k). Accordingly, in the second example, the PUs 502 and 506 (within the picture k) have the same reference frame (picture j), but the PUs 502 and 504 (within the picture k) have different reference frames (picture j and picture i).

Figure 15:
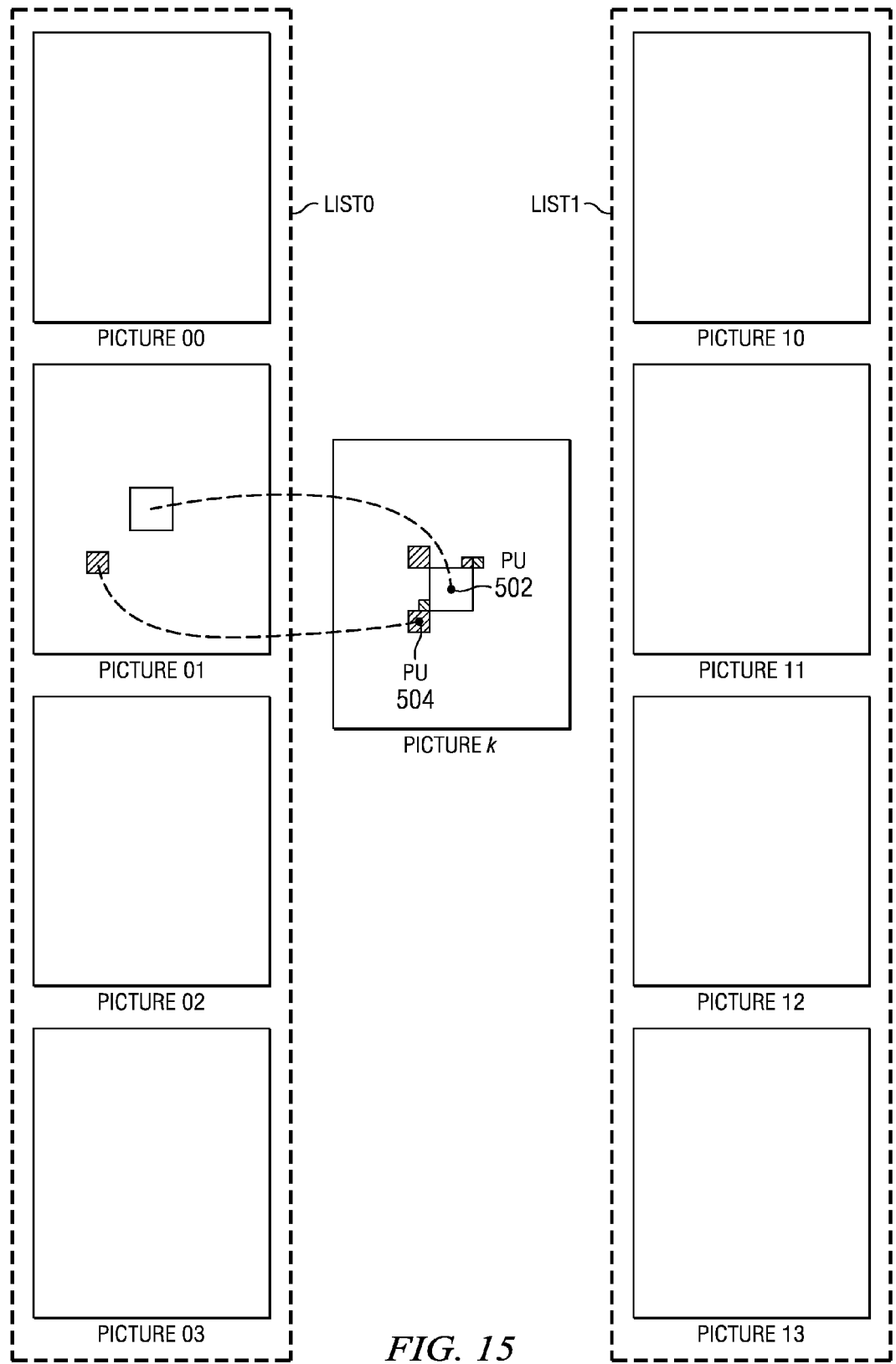
FIG. 15 is a conceptual illustration of a first situation, in which first and second PUs within a first picture of a first reference picture list LIST0 are best matches for first and second PUs (within the picture k) of FIG. 5, respectively.

FIG. 15 is a conceptual illustration of a first situation, in which first and second PUs within a picture 01 of a first reference picture list LIST0 are best matches for the PUs 502 and 504 (within the picture k), respectively, as shown by dashed lines in FIG. 15. For that reason, in the first situation, the picture 01 of the LIST0 is a reference frame for the PUs 502 and 504 (within the picture k). Accordingly, in the first situation: (a) the PUs 502 and 504 (within the picture k) have the same reference frame (picture 01) of the same list (LIST0); and (b) for convenience, in comparison to the PU 502, the PU 504 is referenced herein as having a type-1 motion vector ("T1 vector").

In the examples of FIGS. 15-18: (a) before the encoding device 112 encodes the picture k, the encoding device 112 has already encoded the pictures of the LIST0; and (b) similarly, before the decoding device 116 decodes the picture k, the decoding device 116 has already decoded the pictures of the LIST0. Accordingly, a size of the LIST0 (e.g., total number of pictures in the LIST0) is subject to variation (e.g., in accordance with the MPEG-4 standard). For example, FIGS. 15-18 show four pictures in the LIST0, which are numbered picture Of where: (a) f is a picture number that ranges from 0 through P−1; and (b) P is a total number of pictures within the LIST0. For clarity, although P is subject to variation, FIGS. 15-18 show four pictures in the LIST0, where f ranges from 0 through 3.

Figure 16:
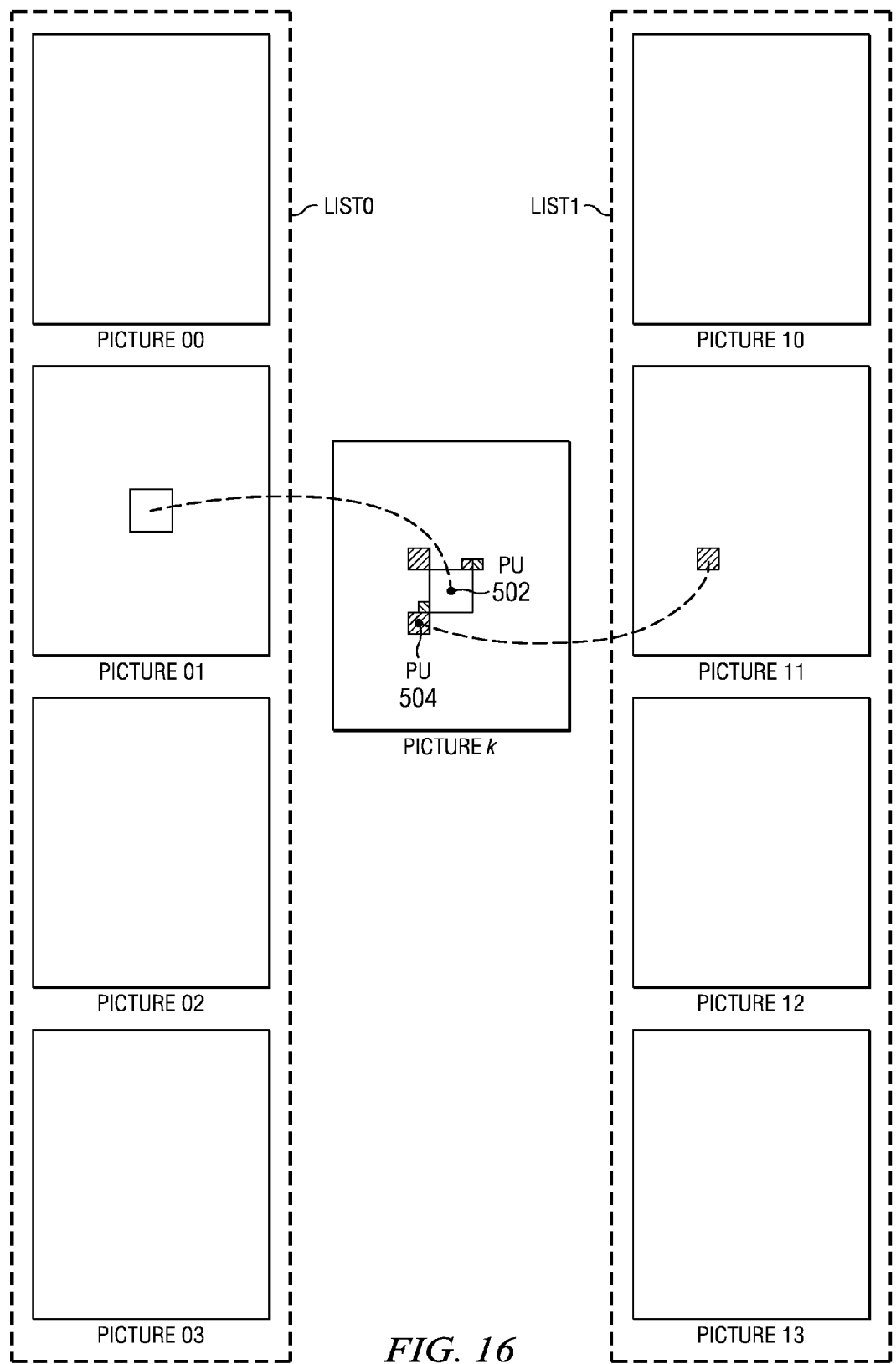
FIG. 16 is a conceptual illustration of a second situation, in which: (a) the first PU within the first picture of the LIST0 is a best match for the first PU (within the picture k) of FIG. 5; and (b) a second PU within the first picture of a second reference picture list LIST1 is a best match for the second PU (within the picture k) of FIG. 5.

FIG. 16 is a conceptual illustration of a second situation, in which: (a) the first PU within the picture 01 of the LIST0 is a best match for the PU 502 (within the picture k), as shown by a first dashed line in FIG. 16; and (b) a second PU within a picture 11 of a second reference picture list LIST1 is a best match for the PU 504 (within the picture k), as shown by a second dashed line in FIG. 16. For that reason, in the second situation: (a) the picture 01 of the LIST0 is a reference frame for the PU 502 (within the picture k); and (b) the picture 11 of the LIST1 is a reference frame for the PU 504 (within the picture k). In the second situation, the picture 11 of the LIST1 is identical to (e.g., is the same as) the picture 01 of the LIST0. Accordingly, in the second situation: (a) the PUs 502 and 504 (within the picture k) have the same reference frame (picture 01 and its identical picture 11) of different lists (LIST0 and LIST1); and (b) for convenience, in comparison to the PU 502, the PU 504 is referenced herein as having a type-2 motion vector ("T2 vector").

In the examples of FIGS. 15-18: (a) before the encoding device 112 encodes the picture k, the encoding device 112 has already encoded the pictures of the LIST1; and (b) similarly, before the decoding device 116 decodes the picture k, the decoding device 116 has already decoded the pictures of the LIST1. Accordingly, a size of the LIST1 (e.g., total number of pictures in the LIST1) is subject to variation (e.g., in accordance with the MPEG-4 standard). For example, FIGS. 15-18 show four pictures in the LIST1, which are numbered picture 1g, where: (a) g is a picture number that ranges from 0 through Q−1; and (b) Q is a total number of pictures within the LIST1. For clarity, although Q is subject to variation, FIGS. 15-18 show four pictures in the LIST1, where g ranges from 0 through 3.

Figure 17:
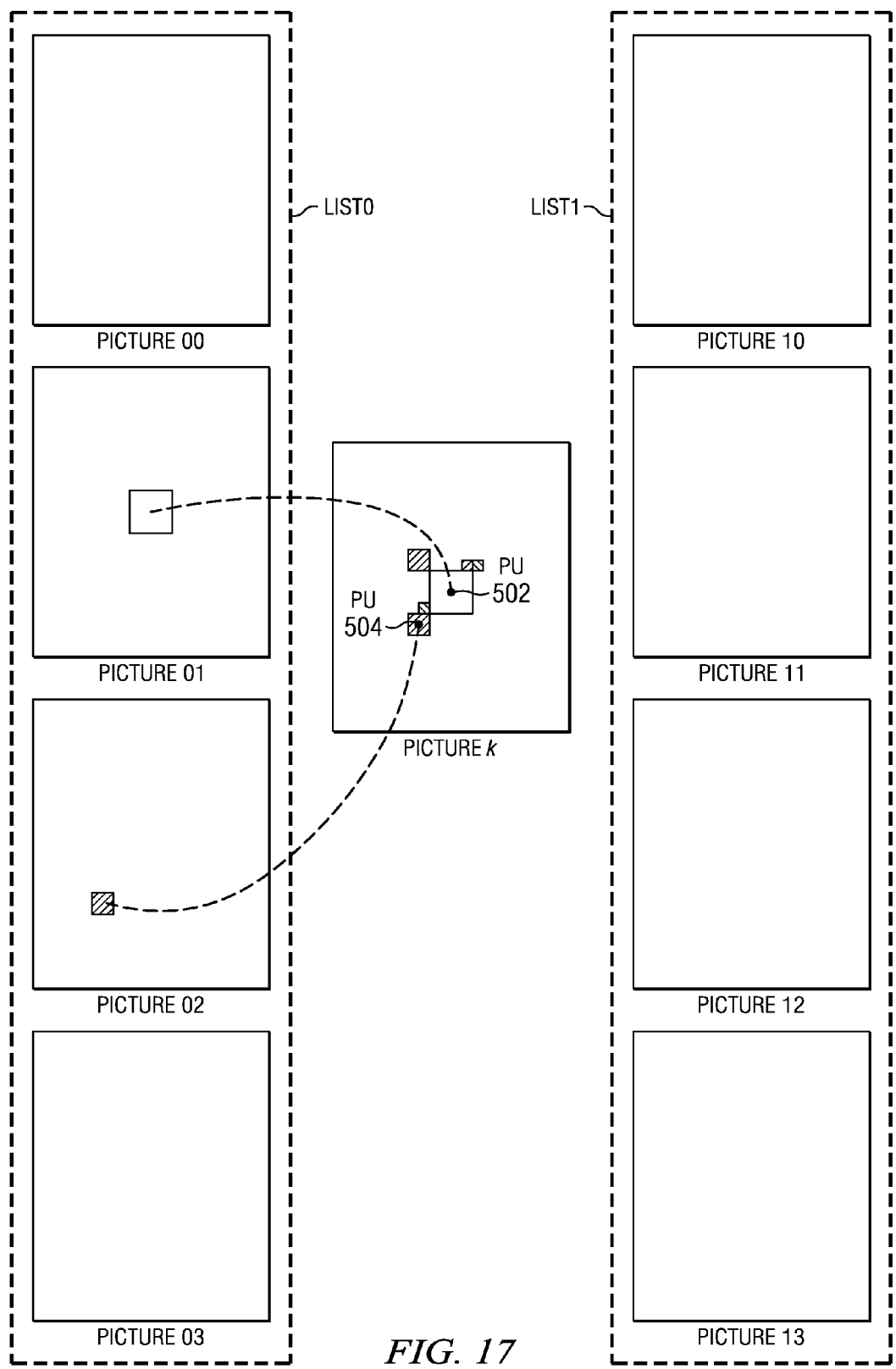
FIG. 17 is a conceptual illustration of a third situation, in which: (a) the first PU within the first picture of the LIST0 is a best match for the first PU (within the picture k) of FIG. 5; and (b) a second PU within a second picture of the LIST0 is a best match for the second PU (within the picture k) of FIG. 5.

FIG. 17 is a conceptual illustration of a third situation, in which: (a) the first PU within the picture 01 of the LIST0 is a best match for the PU 502 (within the picture k), as shown by a first dashed line in FIG. 17; and (b) a second PU within a picture 02 of the LIST0 is a best match for the PU 504 (within the picture k), as shown by a second dashed line in FIG. 17. For that reason, in the third situation: (a) the picture 01 of the LIST0 is a reference frame for the PU 502 (within the picture k); and (b) the picture 02 of the LIST0 is a reference frame for the PU 504 (within the picture k). Accordingly, in the third situation: (a) the PUs 502 and 504 (within the picture k) have different reference frames (picture 01 and picture 02) of the same list (LIST0); and (b) for convenience, in comparison to the PU 502, the PU 504 is referenced herein as having a type-3 motion vector ("T3 vector").

Figure 18:
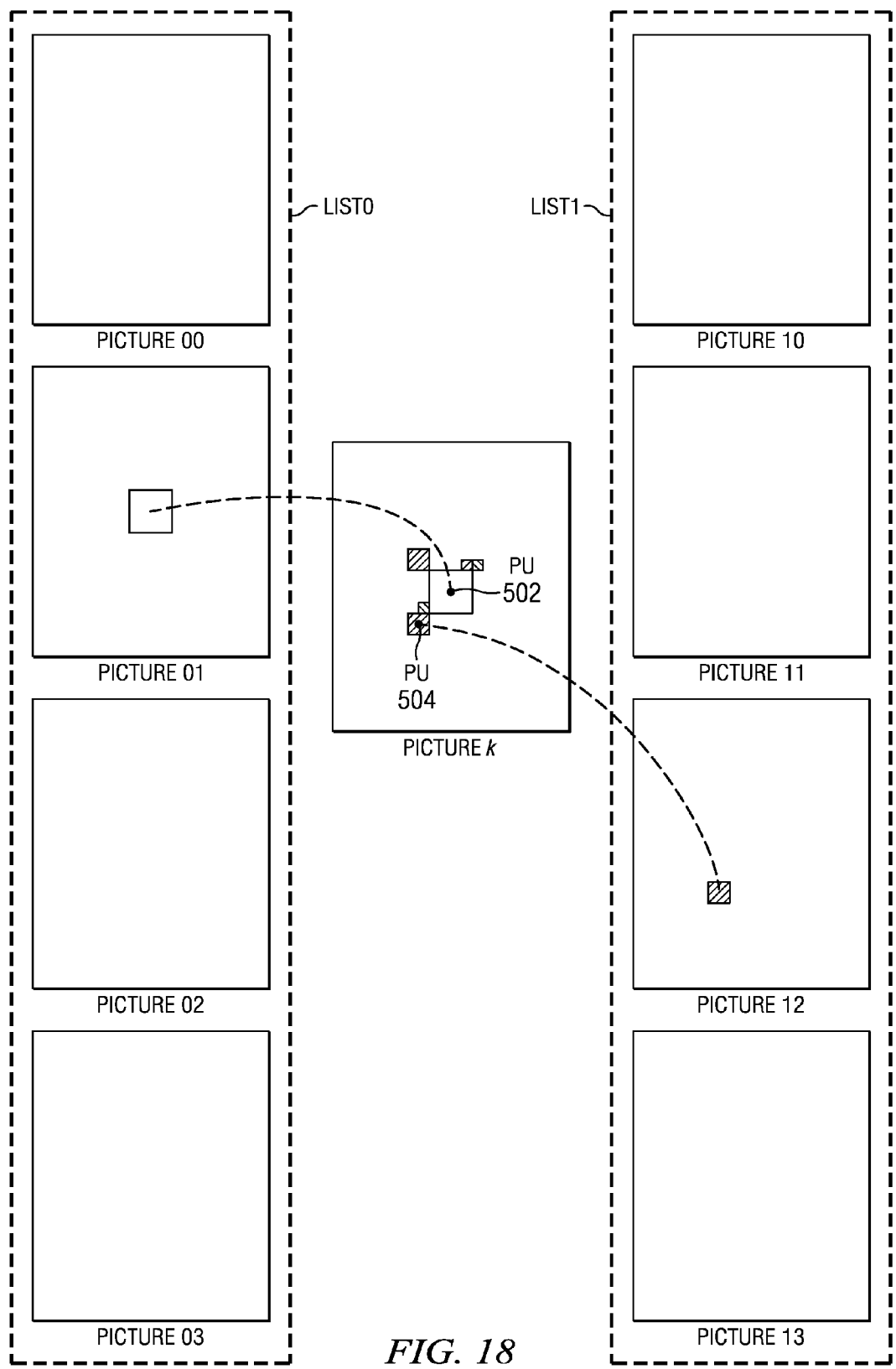
FIG. 18 is a conceptual illustration of a fourth situation, in which: (a) the first PU within the first picture of the LIST0 is a best match for the first PU (within the picture k) of FIG. 5; and (b) a second PU within a second picture of the LIST1 is a best match for the second PU (within the picture k) of FIG. 5.

FIG. 18 is a conceptual illustration of a fourth situation, in which: (a) the first PU within the picture 01 of the LIST0 is a best match for the PU 502 (within the picture k), as shown by a first dashed line in FIG. 18; and (b) a second PU within a picture 12 of the LIST1 is a best match for the PU 504 (within the picture k), as shown by a second dashed line in FIG. 18. For that reason, in the fourth situation: (a) the picture 01 of the LIST0 is a reference frame for the PU 502 (within the picture k); and (b) the picture 12 of the LIST1 is a reference frame for the PU 504 (within the picture k). Accordingly, in the fourth situation: (a) the PUs 502 and 504 (within the picture k) have different reference frames (picture 01 and picture 12) of different lists (LIST0 and LIST1); and (b) for convenience, in comparison to the PU 502, the PU 504 is referenced herein as having a type-4 motion vector ("T4 vector").

Figure 19:
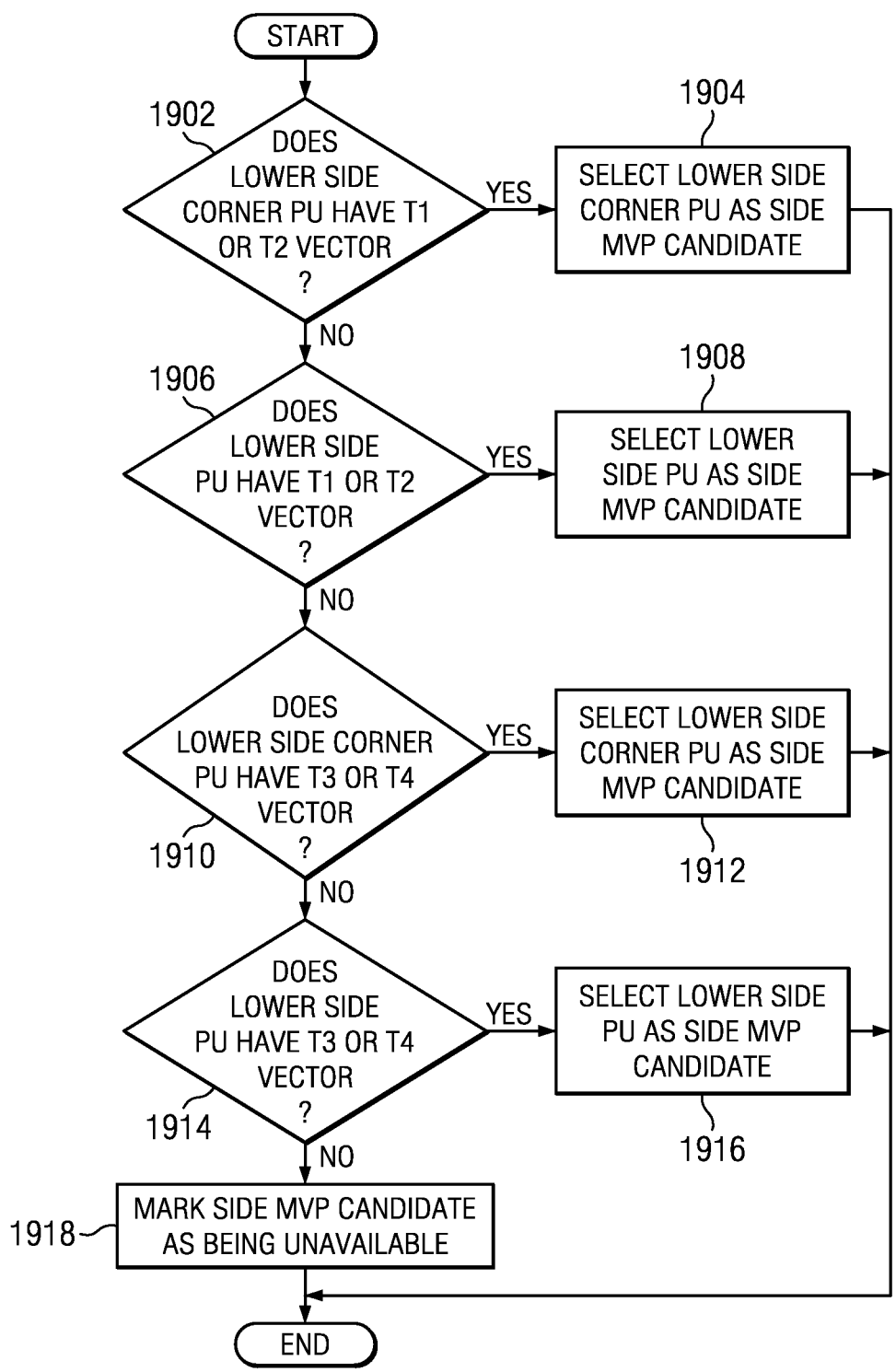
FIG. 19 is a flowchart of a first operation of the encoding device of the system of FIG. 1, in a third embodiment.

FIG. 19 is a flowchart of a first operation of the encoding device 112, in a third embodiment. At a step 1902, the encoding device 112 identifies and scans the lower side corner PU to determine whether the lower side corner PU has a T1 vector, a T2 vector, or neither. At a step 1904, in response to the encoding device 112 determining (at the step 1902) that the lower side corner PU has a T1 vector or a T2 vector: (a) the encoding device 112 selects the lower side corner PU as the side MVP candidate, so that the lower side corner PU's motion vector is used as the side MVP candidate's motion vector; and (b) the first operation ends.

At a step 1906, in response to the encoding device 112 determining (at the step 1902) that the lower side corner PU has neither a T1 vector nor a T2 vector, the encoding device 112 identifies and scans the lower side PU to determine whether the lower side PU has a T1 vector, a T2 vector, or neither. At a step 1908, in response to the encoding device 112 determining (at the step 1906) that the lower side PU has a T1 vector or a T2 vector: (a) the encoding device 112 selects the lower side PU as the side MVP candidate, so that the lower side PU's motion vector is used as the side MVP candidate's motion vector; and (b) the first operation ends.

At a step 1910, in response to the encoding device 112 determining (at the step 1906) that the lower side PU has neither a T1 vector nor a T2 vector, the encoding device 112 identifies and scans the lower side corner PU to determine whether the lower side corner PU has a T3 vector, a T4 vector, or neither. At a step 1912, in response to the encoding device 112 determining (at the step 1910) that the lower side corner PU has a T3 vector or a T4 vector: (a) the encoding device 112 selects the lower side corner PU as the side MVP candidate, so that the lower side corner PU's motion vector is used as the side MVP candidate's motion vector; and (b) the first operation ends.

At a step 1914, in response to the encoding device 112 determining (at the step 1910) that the lower side corner PU has neither a T3 vector nor a T4 vector, the encoding device 112 identifies and scans the lower side PU to determine whether the lower side PU has a T3 vector, a T4 vector, or neither. At a step 1916, in response to the encoding device 112 determining (at the step 1914) that the lower side PU has a T3 vector or a T4 vector: (a) the encoding device 112 selects the lower side PU as the side MVP candidate, so that the lower side PU's motion vector is used as the side MVP candidate's motion vector; and (b) the first operation ends.

At a step 1918, in response to the encoding device 112 determining (at the step 1914) that the lower side PU has neither a T3 vector nor a T4 vector: (a) the encoding device 112 marks the side MVP candidate as being unavailable; and (b) the first operation ends.

Figure 20A:
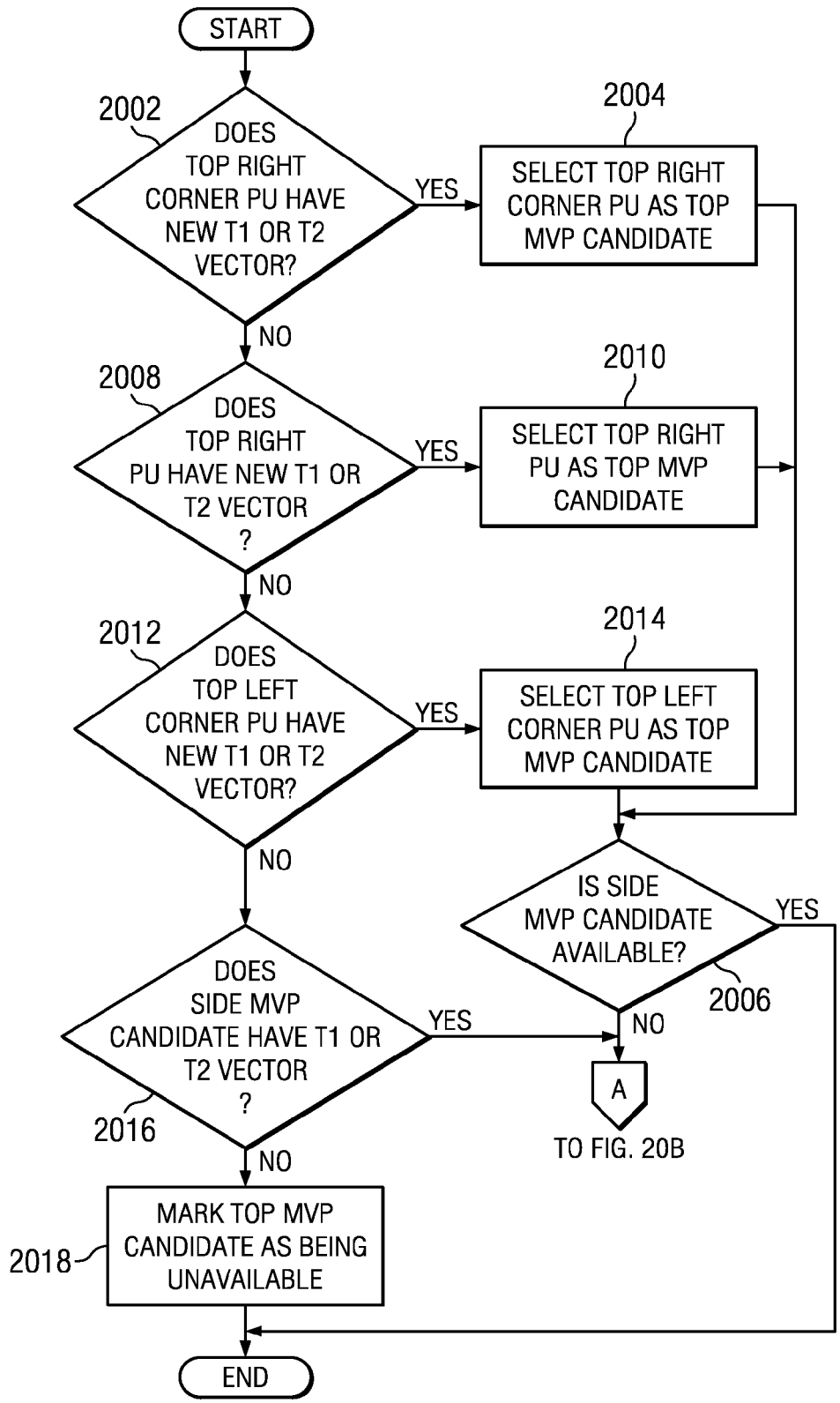
FIGS. 20A and 20B are flowcharts of a second operation of the encoding device of the system of FIG. 1, in the third embodiment.
Figure 20B:
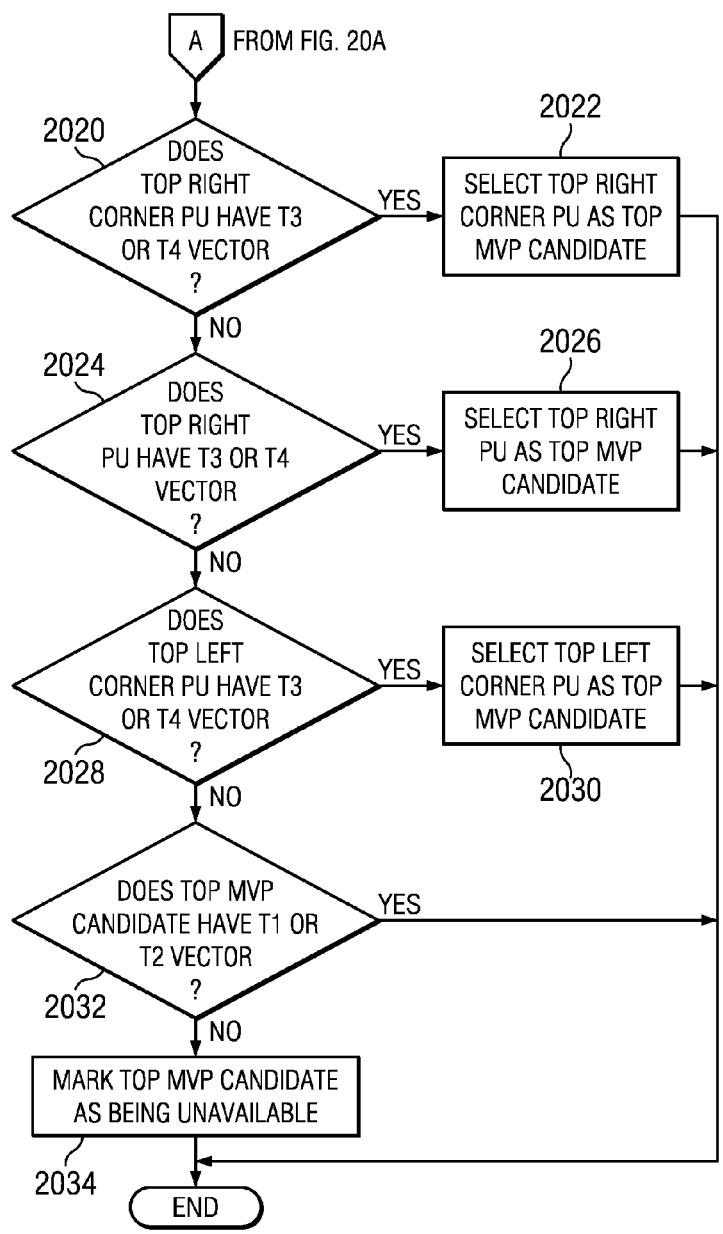

FIGS. 20A and 20B (collectively "FIG. 20") are flowcharts of a second operation of the encoding device 112, in the third embodiment. At a step 2002, the encoding device 112 identifies and scans the top right corner PU to determine whether the top right corner PU has a T1 vector, a T2 vector, or neither. At a step 2004, in response to the encoding device 112 determining (at the step 2002) that the top right corner PU has a T1 vector or a T2 vector: (a) the encoding device 112 selects the top right corner PU as the top MVP candidate, so that the top right corner PU's motion vector is used as the top MVP candidate's motion vector; and (b) the second operation continues to a step 2006.

At a step 2008, in response to the encoding device 112 determining (at the step 2002) that the top right corner PU has neither a T1 vector nor a T2 vector, the encoding device 112 identifies and scans the top right PU to determine whether the top right PU has a T1 vector, a T2 vector, or neither. At a step 2010, in response to the encoding device 112 determining (at the step 2008) that the top right PU has a T1 vector or a T2 vector: (a) the encoding device 112 selects the top right PU as the top MVP candidate, so that the top right PU's motion vector is used as the top MVP candidate's motion vector; and (b) the second operation continues to the step 2006.

At a step 2012, in response to the encoding device 112 determining (at the step 2008) that the top right PU has neither a T1 vector nor a T2 vector, the encoding device 112 identifies and scans the top left corner PU to determine whether the top left corner PU has a T1 vector, a T2 vector, or neither. At a step 2014, in response to the encoding device 112 determining (at the step 2012) that the top left corner PU has a T1 vector or a T2 vector: (a) the encoding device 112 selects the top left corner PU as the top MVP candidate, so that the top left corner PU's motion vector is used as the top MVP candidate's motion vector; and (b) the second operation continues to the step 2006.

At a step 2016, in response to the encoding device 112 determining (at the step 2012) that the top left corner PU has neither a T1 vector nor a T2 vector, the encoding device 112 determines whether the side MVP candidate (if available) has a T1 vector, a T2 vector, or neither. At a step 2018, in response to the encoding device 112 determining (at the step 2016) that the side MVP candidate (if available) has neither a T1 vector nor a T2 vector: (a) the encoding device 112 marks the top MVP candidate as being unavailable; and (b) the second operation ends. Conversely, in response to the encoding device 112 determining (at the step 2016) that the side MVP candidate has a T1 vector or a T2 vector (or that the side MVP candidate is unavailable), the second operation continues from the step 2016 to a step 2020.

Referring again to the step 2006, in response to the encoding device 112 determining (at the step 2006) that the side MVP candidate is available, the second operation ends. Conversely, in response to the encoding device 112 determining (at the step 2006) that the side MVP candidate is unavailable, the second operation continues from the step 2006 to the step 2020, so that the encoding device 112 proceeds to determine whether the top right corner PU, the top right PU or the top left corner PU has a T3 vector or a T4 vector (in an attempt to substitute the top MVP candidate's T1 vector or T2 vector in place of the unavailable side MVP candidate's motion vector).

At the step 2020, the encoding device 112 identifies and scans the top right corner PU to determine whether the top right corner PU has a T3 vector, a T4 vector, or neither. At a step 2022, in response to the encoding device 112 determining (at the step 2020) that the top right corner PU has a T3 vector or a T4 vector: (a) if the side MVP candidate is unavailable, then the encoding device 112 substitutes the top MVP candidate's T1 vector or T2 vector in place of the unavailable side MVP candidate's motion vector, so that the side MVP candidate thereby becomes available; (b) the encoding device 112 selects the top right corner PU as the top MVP candidate, so that the top right corner PU's T3 vector or T4 vector is used as the top MVP candidate's motion vector; and (c) the second operation ends.

At a step 2024, in response to the encoding device 112 determining (at the step 2020) that the top right corner PU has neither a T3 vector nor a T4 vector, the encoding device 112 identifies and scans the top right PU to determine whether the top right PU has a T3 vector, a T4 vector, or neither. At a step 2026, in response to the encoding device 112 determining (at the step 2024) that the top right PU has a T3 vector or a T4 vector: (a) if the side MVP candidate is unavailable, then the encoding device 112 substitutes the top MVP candidate's T1 vector or T2 vector in place of the unavailable side MVP candidate's motion vector, so that the side MVP candidate thereby becomes available; (b) the encoding device 112 selects the top right PU as the top MVP candidate, so that the top right PU's T3 vector or T4 vector is used as the top MVP candidate's motion vector; and (c) the second operation ends.

At a step 2028, in response to the encoding device 112 determining (at the step 2024) that the top right PU has neither a T3 vector nor a T4 vector, the encoding device 112 identifies and scans the top left corner PU to determine whether the top left corner PU has a T3 vector, a T4 vector, or neither. At a step 2030, in response to the encoding device 112 determining (at the step 2028) that the top left corner PU has a T3 vector or a T4 vector: (a) if the side MVP candidate is unavailable, then the encoding device 112 substitutes the top MVP candidate's T1 vector or T2 vector in place of the unavailable side MVP candidate's motion vector, so that the side MVP candidate thereby becomes available; (b) the encoding device 112 selects the top left corner PU as the top MVP candidate, so that the top left corner PU's T3 vector or T4 vector is used as the top MVP candidate's motion vector; and (c) the second operation ends.

At a step 2032, in response to the encoding device 112 determining (at the step 2028) that the top left corner PU has neither a T3 vector nor a T4 vector, the encoding device 112 determines whether the top MVP candidate has a T1 vector, a T2 vector, or neither. In that manner, the encoding device 112 determines whether it performed the steps 2020, 2024 and 2028 in an attempt to substitute the top MVP candidate's T1 vector or T2 vector in place of the unavailable side MVP candidate's motion vector. At a step 2034, in response to the encoding device 112 determining (at the step 2032) that the top MVP candidate has neither a T1 vector nor a T2 vector: (a) the encoding device 112 marks the top MVP candidate as being unavailable; and (b) the second operation ends. Conversely, in response to the encoding device 112 determining (at the step 2032) that the top MVP candidate has a T1 vector or a T2 vector: (a) the encoding device 112 determines that it performed the steps 2020, 2024 and 2028 in an attempt to substitute the top MVP candidate's T1 vector or T2 vector in place of the unavailable side MVP candidate's motion vector; and (b) the second operation ends.

Figure 21:
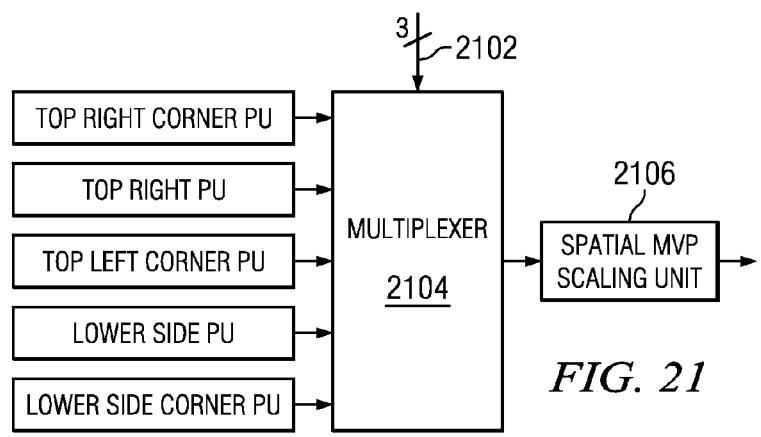
FIG. 21 is a block diagram of hardware of the system of FIG. 1 for performing spatial MVP scaling.

FIG. 21 is a block diagram of hardware (e.g., circuitry) of the system 100 for performing spatial MVP scaling. If the side MVP candidate is available, yet has neither a T1 vector nor a T2 vector, then the side MVP candidate's motion vector is either a T3 vector or a T4 vector. Similarly, if the top MVP candidate is available, yet has neither a T1 vector nor a T2 vector, then the top MVP candidate's motion vector is either a T3 vector or a T4 vector. In view of the step 2018 (FIG. 20): (a) if the side MVP candidate's motion vector is a T3 vector or a T4 vector, then the system 100 ensures that the top MVP candidate's motion vector is neither a T3 vector nor a T4 vector; and (b) if the top MVP candidate's motion vector is a T3 vector or a T4 vector, then the system 100 ensures that the side MVP candidate's motion vector is neither a T3 vector nor a T4 vector.

Accordingly, in response to logic states of control lines 2102 (which select one of the following PUs according to the operations of FIGS. 19 and 20), a multiplexer 2104 outputs one of the following PUs to a spatial MVP scaling unit 2106: (a) the lower side corner PU if it is the side MVP candidate, and if its motion vector is a T3 vector or a T4 vector; (b) the lower side PU if it is the side MVP candidate, and if its motion vector is a T3 vector or a T4 vector; (c) the top right corner PU if it is the top MVP candidate, and if its motion vector is a T3 vector or a T4 vector; (d) the top right PU if it is the top MVP candidate, and if its motion vector is a T3 vector or a T4 vector; and (e) the top left corner PU if it is the top MVP candidate, and if its motion vector is a T3 vector or a T4 vector. The spatial MVP scaling unit 2106 receives such PU (which is output from the multiplexer 2104) and performs motion vector scaling (or "spatial MVP scaling") of such PU's motion vector in order to suitably normalize such motion vector relative to the current PU's motion vector. In that manner, the hardware of FIG. 21 accounts for a difference in: (a) a temporal distance between such PU and its respective reference frame; and (b) a temporal distance between the current PU and its respective reference frame. By comparison, if a PU has a T1 vector or a T2 vector, then the hardware of FIG. 21 does not perform spatial MVP scaling of such PU's motion vector, because such difference is non-existent. Advantageously, the one spatial MVP scaling unit 2106 is shared by five PUs (namely, the lower side corner PU, the lower side PU, the top right corner PU, the top right PU and the top left corner PU), because the spatial MVP scaling unit 2106 suitably normalizes a T3 vector or T4 vector from only one (if any) of those five PUs relative to the current PU's motion vector.

Accordingly, in the third embodiment: (a) the encoding device 112 includes such hardware of FIG. 21 for performing the spatial MVP scaling in the encoding operations; and (b) similarly, the decoding device 116 includes such hardware of FIG. 21 for performing the spatial MVP scaling in the decoding operations. In an alternative embodiment: (a) the encoding device 112 is a general purpose computational resource (e.g., a general purpose computer), which performs the spatial MVP scaling (according to the technique of FIG. 21) in response to instructions of the computer-readable program that is stored on the computer-readable medium 120, instead of dedicating special purpose hardware in the encoding device 112 to perform the spatial MVP scaling; and (b) similarly, the decoding device 116 is a general purpose computational resource, which performs the spatial MVP scaling (according to the technique of FIG. 21) in response to instructions of the computer-readable program that is stored on the computer-readable medium 122, instead of dedicating special purpose hardware in the decoding device 116 to perform the spatial MVP scaling.

In that manner, the encoding device 112 reduces its processing load and hardware area in the third embodiment, without reducing the coding efficiency, because the encoding device 112 reduces instances of spatial MVP scaling. For example, the encoding device 112 so reduces instances of spatial MVP scaling by: (a) scanning the lower side corner PU and the lower side PU to determine whether either of them has a T1 vector or a T2 vector, before scanning them to determine whether either of them has a T3 vector or a T4 vector, as discussed hereinabove in connection with FIG. 19; (b) scanning the top right corner PU, the top right PU and the top left corner PU to determine whether any of them has a T1 vector or a T2 vector, before scanning them to determine whether any of them has a T3 vector or a T4 vector, as discussed hereinabove in connection with FIG. 20; and (c) scanning the top right corner PU, the top right PU and the top left corner PU to determine whether any of them has a T3 vector or a T4 vector, unless the side MVP candidate has a T3 vector or a T4 vector (e.g., only if the side MVP candidate has a T1 vector or a T2 vector or if the side MVP candidate is unavailable), as discussed hereinabove in connection with FIG. 20.

After the encoding device 112 performs the operations of FIGS. 19, 20 and 21, it performs the operations of FIG. 9 (in response to the available MVP candidates' respective motion vectors, as suitably normalized by the spatial MVP scaling unit 2106 of FIG. 21) and the remainder of its encoding operations.

In the third embodiment, the decoding device 116: (a) performs the operations of FIGS. 19 and 20 to identify the side MVP candidate (if available) and the top MVP candidate (if available); (b) identifies the temporal MVP candidate (if available); and (c) in response to such identification, determines whether the decoded MVP index is referencing the side MVP candidate, the top MVP candidate or the temporal MVP candidate, according to the MVP Index Table above.

Accordingly, in the first, second and third embodiments, the decoding device 116 decodes the current PU's motion vector by: (a) decoding such difference and the MVP index from the encoded bit stream; (b) identifying the side MVP candidate (if available), the top MVP candidate (if available) and the temporal MVP candidate (if available), as discussed hereinabove; (c) in response to such identification, determining whether the decoded MVP index is referencing the side MVP candidate, the top MVP candidate or the temporal MVP candidate, according to the MVP Index Table above; (d) in response to such determination and the decoded MVP index, identifying the selected motion vector; and (e) adding such decoded difference to the selected motion vector for calculating the current PU's motion vector. The decoding device 116 so decodes respective motion vectors of various PUs (within the picture k), each of which is so decoded in succession as the current PU, in the raster scan order (e.g., left-to-right and top-to-bottom as indicated by raster scanning arrows 302 and 304, respectively, of FIG. 3).

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable computer) performs various operations discussed hereinabove. Accordingly, such operations are computer-implemented.

Such program (e.g., software, firmware, and/or microcode) is written in one or more programming languages, such as: an object-oriented programming language (e.g., Java, Smalltalk, and C++); a conventional procedural programming language (e.g., C); and/or any suitable combination thereof. In a first situation, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described, a wide range of alternative embodiments is contemplated in the foregoing disclosure.

What is claimed is:

1. A method performed by an information handling system for encoding a video sequence, the method comprising:
   identifying a prediction unit within a picture of the video sequence, wherein the prediction unit is bordered by neighboring prediction units within the picture, including first and second neighboring prediction units that are separated from one another by at least a third neighboring prediction unit, and wherein a best match for the prediction unit is located within a different first reference picture;
   scanning a subset of the neighboring prediction units to select a motion vector predictor ("MVP") candidate, wherein the subset includes at least the first and second neighboring prediction units and excludes at least the third neighboring prediction unit, and wherein the scanning includes: selecting a first type of the MVP candidate if available to be the selected MVP candidate, wherein the first type of the MVP candidate is defined as having a best match located within the first reference picture; and, in response to the first type of the MVP candidate being unavailable, selecting a second type of the MVP candidate to be the selected MVP candidate, wherein the second type of the MVP candidate is defined as having a best match located within a different second reference picture;
   calculating a difference between: a motion vector of the selected MVP candidate; and a motion vector of the prediction unit; and
   encoding the difference and an index to identify the selected MVP candidate.

2. The method of claim 1, wherein the encoding comprises:
   encoding the difference and the index to identify the selected MVP candidate, in response to no other MVP candidate being available.

3. The method of claim 1, and comprising:
   in response to at least one other MVP candidate being available, calculating at least one other difference between: a motion vector of the other MVP candidate; and the motion vector of the prediction unit.

4. The method of claim 3, wherein the other MVP candidate is a temporal MVP candidate from a different picture of the video sequence.

5. The method of claim 3, wherein the encoding comprises:
   encoding the difference and the index to identify the selected MVP candidate, in response to the difference being less than the other difference.

6. The method of claim 5, wherein the neighboring prediction units include fourth and fifth neighboring prediction units, and comprising:
   scanning the fourth and fifth neighboring prediction units to select the other MVP candidate.

7. The method of claim 6, wherein a first side of the prediction unit is bordered by the first, second and third neighboring prediction units, and wherein a second side of the prediction unit is bordered by the fourth and fifth neighboring prediction units.

8. The method of claim 7, wherein: the fourth neighboring prediction unit is bordered by the fifth neighboring prediction unit; the prediction unit has at least first, second and third corners; the first corner is bordered by the first neighboring prediction unit; the second corner is bordered by the second neighboring prediction unit; and the third corner is bordered by the fourth and fifth neighboring prediction units.

9. The method of claim 8, wherein: the neighboring prediction units include a sixth neighboring prediction unit; the subset includes the sixth neighboring prediction unit; the first neighboring prediction unit is bordered by the sixth neighboring prediction unit; the first corner is bordered by the sixth neighboring prediction unit; and the second neighboring prediction unit is separated from the sixth neighboring prediction unit by at least the third neighboring prediction unit.

10. The method of claim 9, wherein: the neighboring prediction units include a seventh neighboring prediction unit; and the second neighboring prediction unit is separated from the fifth neighboring prediction unit by at least the seventh neighboring prediction unit.

11. A method performed by an information handling system for decoding a video sequence, the method comprising:
    identifying a prediction unit within a picture of the video sequence, wherein the prediction unit is bordered by neighboring prediction units within the picture, including first and second neighboring prediction units that are separated from one another by at least a third neighboring prediction unit, and wherein a best match for the prediction unit is located within a different first reference picture;
    scanning a subset of the neighboring prediction units to select a motion vector predictor ("MVP") candidate, wherein the subset includes at least the first and second neighboring prediction units and excludes at least the third neighboring prediction unit, and wherein the scanning includes: selecting a first type of the MVP candidate if available to be the selected MVP candidate, wherein the first type of the MVP candidate is defined as having a best match located within the first reference picture; and, in response to the first type of the MVP candidate being unavailable, selecting a second type of the MVP candidate to be the selected MVP candidate, wherein the second type of the MVP candidate is defined as having a best match located within a different second reference picture;
    decoding a difference; and
    calculating a motion vector of the prediction unit, wherein the calculating includes adding the difference to a motion vector of the selected MVP candidate.

12. The method of claim 11, and comprising:
    decoding an index; and
    in response to whether at least one other MVP candidate is available, determining whether the selected MVP candidate is identified by the index.

13. The method of claim 12, wherein the calculating comprises:
    in response to the selected MVP candidate being identified by the index, calculating the motion vector of the prediction unit.

14. The method of claim 12, wherein the neighboring prediction units include fourth and fifth neighboring prediction units, and comprising:
    scanning the fourth and fifth neighboring prediction units to select the other MVP candidate.

15. The method of claim 14, wherein a first side of the prediction unit is bordered by the first, second and third neighboring prediction units, and wherein a second side of the prediction unit is bordered by the fourth and fifth neighboring prediction units.

16. The method of claim 15, wherein: the fourth neighboring prediction unit is bordered by the fifth neighboring prediction unit; the prediction unit has at least first, second and third corners; the first corner is bordered by the first neighboring prediction unit; the second corner is bordered by the second neighboring prediction unit; and the third corner is bordered by the fourth and fifth neighboring prediction units.

17. The method of claim 16, wherein: the neighboring prediction units include a sixth neighboring prediction unit; the subset includes the sixth neighboring prediction unit; the first neighboring prediction unit is bordered by the sixth neighboring prediction unit; the first corner is bordered by the sixth neighboring prediction unit; and the second neighboring prediction unit is separated from the sixth neighboring prediction unit by at least the third neighboring prediction unit.

18. The method of claim 17, wherein: the neighboring prediction units include a seventh neighboring prediction unit; and the second neighboring prediction unit is separated from the fifth neighboring prediction unit by at least the seventh neighboring prediction unit.

19. A system for encoding a video sequence, the system comprising:
    an encoder for: identifying a prediction unit within a picture of the video sequence, wherein the prediction unit is bordered by neighboring prediction units within the picture, including first and second neighboring prediction units that are separated from one another by at least a third neighboring prediction unit, and wherein a best match for the prediction unit is located within a different first reference picture; scanning a subset of the neighboring prediction units to select a motion vector predictor ("MVP") candidate, wherein the subset includes at least the first and second neighboring prediction units and excludes at least the third neighboring prediction unit; calculating a difference between a motion vector of the selected MVP candidate and a motion vector of the prediction unit; and encoding the difference and an index to identify the selected MVP candidate; and
    wherein the scanning includes: selecting a first type of the MVP candidate if available to be the selected MVP candidate, wherein the first type of the MVP candidate is defined as having a best match located within the first reference picture; and, in response to the first type of the MVP candidate being unavailable, selecting a second type of the MVP candidate to be the selected MVP candidate, wherein the second type of the MVP candidate is defined as having a best match located within a different second reference picture.

20. The system of claim 19, wherein the encoder is for: encoding the difference and the index to identify the selected MVP candidate, in response to no other MVP candidate being available.

21. The system of claim 19, wherein the encoder is for: in response to at least one other MVP candidate being available, calculating at least one other difference between a motion vector of the other MVP candidate and the motion vector of the prediction unit.

22. The system of claim 21, wherein the other MVP candidate is a temporal MVP candidate from a different picture of the video sequence.

23. The system of claim 21, wherein the encoder is for: encoding the difference and the index to identify the selected MVP candidate, in response to the difference being less than the other difference.

24. The system of claim 23, wherein the neighboring prediction units include fourth and fifth neighboring prediction units, and wherein the encoder is for: scanning the fourth and fifth neighboring prediction units to select the other MVP candidate.

25. The system of claim 24, wherein a first side of the prediction unit is bordered by the first, second and third neighboring prediction units, and wherein a second side of the prediction unit is bordered by the fourth and fifth neighboring prediction units.

26. The system of claim 25, wherein: the fourth neighboring prediction unit is bordered by the fifth neighboring prediction unit; the prediction unit has at least first, second and third corners; the first corner is bordered by the first neighboring prediction unit; the second corner is bordered by the second neighboring prediction unit; and the third corner is bordered by the fourth and fifth neighboring prediction units.

27. The system of claim 26, wherein: the neighboring prediction units include a sixth neighboring prediction unit; the subset includes the sixth neighboring prediction unit; the first neighboring prediction unit is bordered by the sixth neighboring prediction unit; the first corner is bordered by the sixth neighboring prediction unit; and the second neighboring prediction unit is separated from the sixth neighboring prediction unit by at least the third neighboring prediction unit.

28. The system of claim 27, wherein: the neighboring prediction units include a seventh neighboring prediction unit; and the second neighboring prediction unit is separated from the fifth neighboring prediction unit by at least the seventh neighboring prediction unit.

29. A system for decoding a video sequence, the system comprising:
 a decoder for: identifying a prediction unit within a picture of the video sequence, wherein the prediction unit is bordered by neighboring prediction units within the picture, including first and second neighboring prediction units that are separated from one another by at least a third neighboring prediction unit, and wherein a best match for the prediction unit is located within a different first reference picture; scanning a subset of the neighboring prediction units to select a motion vector predictor ("MVP") candidate, wherein the subset includes at least the first and second neighboring prediction units and excludes at least the third neighboring prediction unit; decoding a difference; and calculating a motion vector of the prediction unit, wherein the calculating includes adding the difference to a motion vector of the selected MVP candidate; and
 wherein the scanning includes: selecting a first type of the MVP candidate if available to be the selected MVP candidate, wherein the first type of the MVP candidate is defined as having a best match located within the first reference picture; and, in response to the first type of the MVP candidate being unavailable, selecting a second type of the MVP candidate to be the selected MVP candidate, wherein the second type of the MVP candidate is defined as having a best match located within a different second reference picture.

30. The system of claim 29, wherein the decoder is for: decoding an index; and, in response to whether at least one other MVP candidate is available, determining whether the selected MVP candidate is identified by the index.

31. The system of claim 30, wherein the decoder is for: in response to the selected MVP candidate being identified by the index, calculating the motion vector of the prediction unit.

32. The system of claim 30, wherein the neighboring prediction units include fourth and fifth neighboring prediction units, and wherein the decoder is for: scanning the fourth and fifth neighboring prediction units to select the other MVP candidate.

33. The system of claim 32, wherein a first side of the prediction unit is bordered by the first, second and third neighboring prediction units, and wherein a second side of the prediction unit is bordered by the fourth and fifth neighboring prediction units.

34. The system of claim 33, wherein: the fourth neighboring prediction unit is bordered by the fifth neighboring prediction unit; the prediction unit has at least first, second and third corners; the first corner is bordered by the first neighboring prediction unit; the second corner is bordered by the second neighboring prediction unit; and the third corner is bordered by the fourth and fifth neighboring prediction units.

35. The system of claim 34, wherein: the neighboring prediction units include a sixth neighboring prediction unit; the subset includes the sixth neighboring prediction unit; the first neighboring prediction unit is bordered by the sixth neighboring prediction unit; the first corner is bordered by the sixth neighboring prediction unit; and the second neighboring prediction unit is separated from the sixth neighboring prediction unit by at least the third neighboring prediction unit.

36. The system of claim 35, wherein: the neighboring prediction units include a seventh neighboring prediction unit; and the second neighboring prediction unit is separated from the fifth neighboring prediction unit by at least the seventh neighboring prediction unit.

37. A computer program product for encoding a video sequence, the computer program product comprising:
 a non-transitory computer-readable storage medium; and
 a computer-readable program stored on the non-transitory computer-readable storage medium, wherein the computer-readable program is processable by an information handling system for causing the information handling system to perform operations for encoding the video sequence, the operations comprising: identifying a prediction unit within a picture of the video sequence, wherein the prediction unit is bordered by neighboring prediction units within the picture, including first and second neighboring prediction units that are separated from one another by at least a third neighboring prediction unit, and wherein a best match for the prediction unit is located within a different first reference picture; scanning a subset of the neighboring prediction units to select a motion vector predictor ("MVP") candidate, wherein the subset includes at least the first and second neighboring prediction units and excludes at least the third neighboring prediction unit; calculating a difference between a motion vector of the selected MVP candidate and a motion vector of the prediction unit;

and encoding the difference and an index to identify the selected MVP candidate; and wherein the scanning includes: selecting a first type of the MVP candidate if available to be the selected MVP candidate, wherein the first type of the MVP candidate is defined as having a best match located within the first reference picture; and, in response to the first type of the MVP candidate being unavailable, selecting a second type of the MVP candidate to be the selected MVP candidate, wherein the second type of the MVP candidate is defined as having a best match located within a different second reference picture.

38. The computer program product of claim 37, wherein the operations comprise: encoding the difference and the index to identify the selected MVP candidate, in response to no other MVP candidate being available.

39. The computer program product of claim 37, wherein the operations comprise: in response to at least one other MVP candidate being available, calculating at least one other difference between a motion vector of the other MVP candidate and the motion vector of the prediction unit.

40. The computer program product of claim 39, wherein the other MVP candidate is a temporal MVP candidate from a different picture of the video sequence.

41. The computer program product of claim 39, wherein the operations comprise: encoding the difference and the index to identify the selected MVP candidate, in response to the difference being less than the other difference.

42. The computer program product of claim 41, wherein the neighboring prediction units include fourth and fifth neighboring prediction units, and wherein the encoder is for: scanning the fourth and fifth neighboring prediction units to select the other MVP candidate.

43. The computer program product of claim 42, wherein a first side of the prediction unit is bordered by the first, second and third neighboring prediction units, and wherein a second side of the prediction unit is bordered by the fourth and fifth neighboring prediction units.

44. The computer program product of claim 43, wherein: the fourth neighboring prediction unit is bordered by the fifth neighboring prediction unit; the prediction unit has at least first, second and third corners; the first corner is bordered by the first neighboring prediction unit; the second corner is bordered by the second neighboring prediction unit; and the third corner is bordered by the fourth and fifth neighboring prediction units.

45. The computer program product of claim 44, wherein: the neighboring prediction units include a sixth neighboring prediction unit; the subset includes the sixth neighboring prediction unit; the first neighboring prediction unit is bordered by the sixth neighboring prediction unit; the first corner is bordered by the sixth neighboring prediction unit; and the second neighboring prediction unit is separated from the sixth neighboring prediction unit by at least the third neighboring prediction unit.

46. The computer program product of claim 45, wherein: the neighboring prediction units include a seventh neighboring prediction unit; and the second neighboring prediction unit is separated from the fifth neighboring prediction unit by at least the seventh neighboring prediction unit.

47. A computer program product for decoding a video sequence, the computer program product comprising:
a non-transitory computer-readable storage medium; and
a computer-readable program stored on the non-transitory computer-readable storage medium, wherein the computer-readable program is processable by an information handling system for causing the information handling system to perform operations for decoding the video sequence, the operations comprising: identifying a prediction unit within a picture of the video sequence, wherein the prediction unit is bordered by neighboring prediction units within the picture, including first and second neighboring prediction units that are separated from one another by at least a third neighboring prediction unit, and wherein a best match for the prediction unit is located within a different first reference picture; scanning a subset of the neighboring prediction units to select a motion vector predictor ("MVP") candidate, wherein the subset includes at least the first and second neighboring prediction units and excludes at least the third neighboring prediction unit; decoding a difference; and calculating a motion vector of the prediction unit, wherein the calculating includes adding the difference to a motion vector of the selected MVP candidate; and wherein the scanning includes: selecting a first type of the MVP candidate if available to be the selected MVP candidate, wherein the first type of the MVP candidate is defined as having a best match located within the first reference picture; and, in response to the first type of the MVP candidate being unavailable, selecting a second type of the MVP candidate to be the selected MVP candidate, wherein the second type of the MVP candidate is defined as having a best match located within a different second reference picture.

48. The computer program product of claim 47, wherein the operations comprise: decoding an index; and, in response to whether at least one other MVP candidate is available, determining whether the selected MVP candidate is identified by the index.

49. The computer program product of claim 48, wherein the operations comprise: in response to the selected MVP candidate being identified by the index, calculating the motion vector of the prediction unit.

50. The computer program product of claim 48, wherein the neighboring prediction units include fourth and fifth neighboring prediction units, and wherein the decoder is for: scanning the fourth and fifth neighboring prediction units to select the other MVP candidate.

51. The computer program product of claim 50, wherein a first side of the prediction unit is bordered by the first, second and third neighboring prediction units, and wherein a second side of the prediction unit is bordered by the fourth and fifth neighboring prediction units.

52. The computer program product of claim 51, wherein: the fourth neighboring prediction unit is bordered by the fifth neighboring prediction unit; the prediction unit has at least first, second and third corners; the first corner is bordered by the first neighboring prediction unit; the second corner is bordered by the second neighboring prediction unit; and the third corner is bordered by the fourth and fifth neighboring prediction units.

53. The computer program product of claim 52, wherein: the neighboring prediction units include a sixth neighboring prediction unit; the subset includes the sixth neighboring prediction unit; the first neighboring prediction unit is bordered by the sixth neighboring prediction unit; the first corner is bordered by the sixth neighboring prediction unit; and the second neighboring prediction unit is separated from the sixth neighboring prediction unit by at least the third neighboring prediction unit.

54. The computer program product of claim 53, wherein: the neighboring prediction units include a seventh neighboring prediction unit; and the second neighboring prediction unit is separated from the fifth neighboring prediction unit by at least the seventh neighboring prediction unit.

* * * * *